United States Patent
Lunde

(12) 
(10) Patent No.: US 6,692,681 B1
(45) Date of Patent: Feb. 17, 2004

(54) METHOD AND APPARATUS FOR MANUFACTURING COMPOSITE STRUCTURES

(75) Inventor: Gerald A. Lunde, Wichita, KS (US)

(73) Assignee: Raytheon Aircraft Company, Wichita, KS (US)

(*) Notice: Subject to any disclaimer, the term of this patent is extended or adjusted under 35 U.S.C. 154(b) by 1091 days.

(21) Appl. No.: 08/790,559

(22) Filed: Jan. 29, 1997

(51) Int. Cl.[7] .................... B29C 70/32; B29C 70/36; B29C 43/56
(52) U.S. Cl. .................... 264/510; 264/257; 264/258; 264/512; 156/173; 156/175
(58) Field of Search .................... 264/510, 512, 264/257, 258; 156/173, 175

(56) References Cited

U.S. PATENT DOCUMENTS

| | | | |
|---|---|---|---|
| 3,257,690 A | 6/1966 | Scott | 18/45 |
| 4,350,485 A | 9/1982 | Larribe | 425/389 |
| 4,780,262 A | * 10/1988 | Von Volkli | 264/512 |
| 5,013,514 A | * 5/1991 | Azzani et al. | 264/512 |
| 5,322,661 A | 6/1994 | Henrio | 264/510 |
| 5,382,150 A | 1/1995 | Henrio | 425/390 |
| 5,571,357 A | * 11/1996 | Darrieux et al. | 156/173 |
| 5,645,668 A | * 7/1997 | Lin et al. | 156/175 |

FOREIGN PATENT DOCUMENTS

| | | |
|---|---|---|
| DE | 4039231 A1 | 6/1992 |
| EP | 0020248 A1 | 12/1980 |
| EP | 0549468 A1 | 6/1993 |
| EP | 0628402 A1 | 12/1994 |
| JP | 60139433 | 7/1985 |
| WO | WO 96/35567 | 11/1996 |

OTHER PUBLICATIONS

Beechcraft Starship 1 Series 2000 Specifications/Performance/Standard Equipment, 1986.
Beechcraft Starship 1, 1986.

(List continued on next page.)

Primary Examiner—Stefan Staicovici
(74) Attorney, Agent, or Firm—William C. Schubert; Glenn H. Lenzen, Jr.

(57) ABSTRACT

Composite structures having a single continuous skin may be formed using automated fiber placement methods. These composite structures include frameless aircraft fuselage components offering an increased interior cabin width over conventional fuselage components. The composite structures may be constructed of multiple layers of fibers and other materials placed on a fiber placement tool that includes a mandrel body surrounded by a bladder or an integral bladder/caul sheet having expansion spaces created within the caul sheet section. Uncured composite structures may be created by placing fibers around the fiber placement tool in a plurality of discontinuous segments that are capable of moving or sliding in relation to each other so that the uncured composite structure is expandable from within. Fluid openings may be provided in the outer surface of the mandrel body for the application of vacuum and/or fluid pressure to secure the bladder to the mandrel body and to assist in the removal of the bladder from the mandrel body, respectively. Uncured composite structures may be sealed between the bladder and is clam shell molds. The uncured structures may be expanded against the inner surface of the molds by creating a vacuum between the bladder and molds.

17 Claims, 16 Drawing Sheets

OTHER PUBLICATIONS

Beechcraft Starship 1, 1987.
Beechcraft Starship, "Introducing The Starship," 1990.
Beechcraft Starship, 1992.
Beechcraft Starship,"Introducing The Starship," 1992.
Beechcraft Starship 2000A, 1993.
Raytheon Aircraft Starship 2000A, Performance/Specifications/Standard Equipment, 1996.
Photograph.
PCT Search Report dated Jun. 19, 1998.
Musch and Bishop, "Tooling With Reinforced Elastometric Materials," *Composites Manufacturing*, 3(2):101–111, 1992.
"Work Instruction".
"Fuselage Manufacturing Assembly Sequence Starship vs PD374 Composite" dated Aug. 8, 1994.
"Fuselage Manufacturing Plan" marked "Preliminary" dated Oct. 13, 1995.
"Manufacturing Plan" marked "Preliminary" dated Nov. 28, 1995.
"Fuselage Product/Process Design Review" dated Dec. 20, 1995.
Drawing set named "Bond Form–Assembly Jig.".
Drawing set named "Bond Form–Assy Jig.".

* cited by examiner

METHOD AND APPARATUS FOR MANUFACTURING COMPOSITE STRUCTURES

BACKGROUND OF THE INVENTION

1. Field of the Invention

This invention relates generally to composite material structures and, more specifically, to fiber placement methods and apparatus for manufacturing composite material shells. In particular, this invention relates to composite material shells, such as aircraft fuselage components, formed using fiber placement and other methods employing a removable mandrel and a bladder with or without an integral caul sheet.

2. Description of the Related Art

The fuselage of an airplane or other similar vehicle is generally a thin shell of revolution. In the case of an airplane, one of the significant loading conditions for a fuselage is circumferential tension resulting from internal pressure. Structurally it is most efficient to carry this loading with a structure having a continuous diameter or hoop without any axial joints. From a manufacturing sense each joint in a structure tends to add cost. Also, from a manufacturing sense each extra component or detail tends to add cost.

Composites have proven to be very useful materials, especially in the field of aviation. Weight is a very important and sensitive subject and any method to limit or reduce it is valuable. In addition, structures of composite materials are usually thinner, allowing for increased internal space or decreased area.

Composite materials, such as carbon fiber present in an organic matrix, have been used to produce corrosion resistant and light weight structures. These structures typically weigh about 25% less than structures made of lightweight metals, such as aluminum, while at the same time offering similar strength to these metals. As a result, composite materials have been used to fabricate a wide variety of structures including, most notably, aircraft structures (such as fuselage shell components, wing sections, tail sections, etc.). However, these composite structures have typically been manufactured by time consuming application methods, such as hand placement.

In addition, when used to manufacture aircraft structures, such as fuselage components, composite structures have typically been manufactured in many separate parts, such as fuselage halves split down the longitudinal axis, that must be bonded or fastened together, typically using a flush joint. For example, in one method, a forward fuselage section with four or more separate composite structure components has been manufactured. Machining and assembling of flush joints into a single uniform component typically requires a substantial amount of time to achieve a uniform and consistent flush joint. In addition to extra time, each flush joint adds additional material and weight to the assembled aircraft component. Therefore, the greater the number of separate parts required to construct a single component, such as fuselage component sections, the larger the amount of time and the greater the amount of weight added to the assembled component.

In an effort to reduce composite part assembly time and to produce lighter weight composite parts, fiber placement (or tow placement) methods have been developed. Such fiber placement methods may include computer control integrated with a fiber placement machine. Operation of such a machine to place tow filaments on a mandrel to form composite structures is known in the art. Fiber placement methods involve the automated placement (typically by winding) of filaments (such as fibrous ribbons or tows which are pre-impregnated with a thermal set resin material such as epoxy) onto a mandrel to produce a component, such as a tube-shaped part. These fibers are typically placed at varying angles and in segments of varying width. A fiber tow is essentially a ribbon of carbon fiber, typically between about ¼" and about ⅛" wide. Using a conventional fiber placement machine, multiple tows are transported to a movable payoff head and applied to a mandrel surface using a roller. Typically, a payoff head includes an automatic cutting system for cutting and restarting individual tows. In addition, typical fiber placement machines include heating devices to vary the temperature and, therefore, the properties of the tows as they are applied. Means for controlling pressure applied to the tows and mandrel during fiber placement are also typically employed.

Although fiber placement processes may be used to produce composite structures of varying dimension and size more quickly and efficiently than other methods, current fiber placement techniques suffer from complications relating to mandrel construction and removal of the mandrel after fiber placement has occurred. In particular, segmented mandrels have been provided having segments that are joined during fiber placement and disassembled after curing. Segmented mandrel designs suffer from numerous problems, including expansion of the mandrel material during heat curing, leakage between mandrel segment joints, and time and effort involved in the assembly and disassembly of mandrel components.

In the construction of composite structures, and aircraft composite structures in particular, interior dimensions of a structure are of particular concern. Although fiber placement techniques have been used to produce aircraft fuselage shell components, these shell components have required cylindrical support frames and elongated longeron support members that serve to support the outer fuselage structure. These frames and longerons are typically wider or deeper than a composite fuselage wall of sandwich construction, and therefore serve to reduce the interior diameter of an aircraft fuselage. In other cases, fiber placed composite structures have been manufactured in non-continuous separate parts, such as separate axial fuselage half or quarter panels, that are assembled to form a single cross sectional shape. These structures suffer from the cost and weight problems described above for other multi-piece composite structure components.

Consequently, a need exists for simplified methods and apparatus for forming relatively large, single piece composite parts, such as aircraft fuselage components. In particular a need exists for simplified methods of mandrel installation and removal. A need also exists for a method of manufacturing composite shell components, such as aircraft fuselage parts, which do not require internal frames or bracing and which have an increased internal diameter.

SUMMARY OF THE INVENTION

In one aspect, this invention is a tool for use in forming a composite body. The tool includes a mandrel body having an outer surface and a bladder having outer and inner surfaces. The bladder has a shape and dimensions complementary to the outer surface of the mandrel body so that the bladder may be fitted around the outer surface of the mandrel body. The tool also includes at least one caul sheet section having an inner surface coupled to the outer surface of the bladder so that the caul sheet section overlays at least a portion of the outer surface of the bladder.

In another aspect, this invention is a tool for use in forming a composite body. The tool includes a mandrel body having an outer surface and one or more fluid openings defined in the mandrel body outer surface. The tool also includes a mandrel body fluid system capable of supplying pressurized fluid or a vacuum to the one or more openings in the mandrel body outer surface.

In another aspect, this invention is a method of forming a composite body including the steps of providing a mandrel body having an outer surface, an elongated shape, and a longitudinal axis. The method includes placing a plurality of fibers on the outer surface of the mandrel body to form an uncured body. In this method, the fibers are placed around the mandrel body in a plurality of discontinuous segments juxtaposed in relation to each other. The discontinuous segments are capable of moving in relation to each other so that the uncured body is expandable from within.

In another aspect, this invention is a method of forming a composite body, including the steps of providing a tool and placing a plurality of fibers on the tool to form an uncured body. In this method the tool includes a mandrel body having an outer surface and a bladder having outer and inner surfaces. The bladder has a shape and dimensions complementary to the outer surface of the mandrel body, and the inner surface of the bladder is fitted around the outer surface of the mandrel body. The tool also includes at least one caul sheet section having outer and inner surfaces. The inner surface of the caul sheet is coupled to the outer surface of the bladder so that the caul sheet section overlays at least a portion of the outer surface of the bladder.

In another aspect, this invention is a method of forming a composite body, including the steps of providing a tool and placing a plurality of fibers on the tool to form an uncured body. In this method, the tool includes a mandrel body having an outer surface and one or more fluid openings defined in the mandrel body outer surface.

In another aspect, this invention includes an elongated tubular composite body part having a longitudinal axis. The composite body part has a sandwich construction including at least one continuous skin of fibers disposed around the longitudinal axis of the body part.

In another aspect, this invention is an elongated composite frameless vehicle fuselage. The frameless vehicle fuselage has a longitudinal axis a sandwich construction having at least one continuous skin of fibers disposed around the longitudinal axis of the body part.

DESCRIPTION OF SPECIFIC EMBODIMENTS

Figure 1:
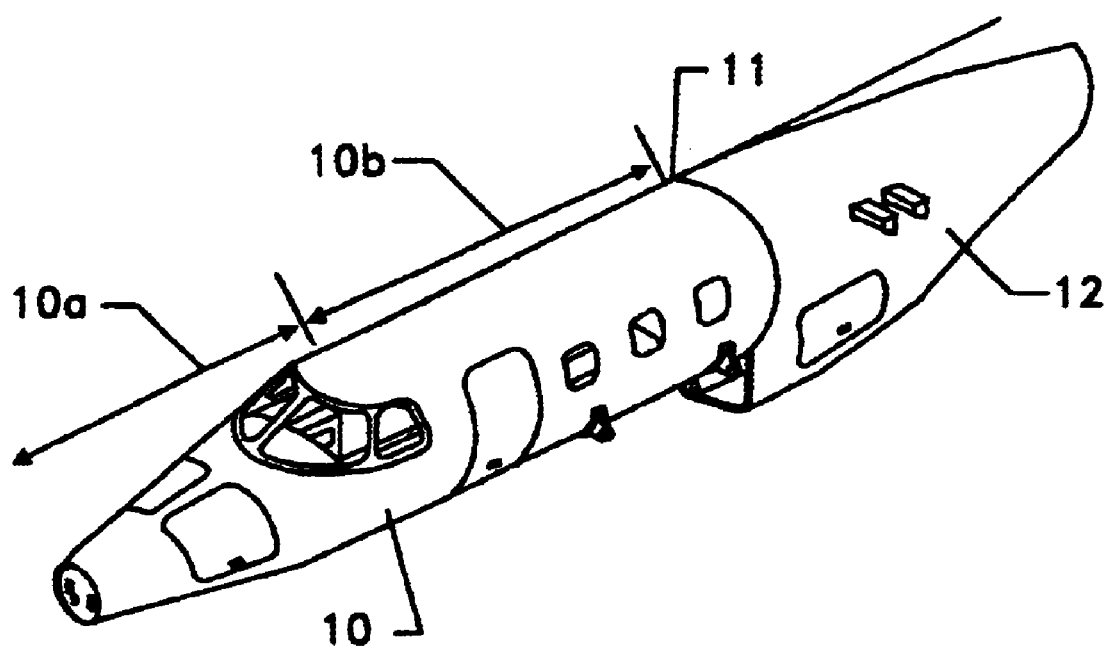
FIG. 1 is a perspective view of a composite aircraft fuselage structure according to one embodiment of the disclosed method and apparatus.

In embodiments of the disclosed method and apparatus, composite structures having high quality, light weight, and low fabrication costs are possible. These characteristics are achieved by, among other things, providing a single piece full cylinder composite structure design having no axial joints, composite shell outer surfaces which are tooled to the outer mold line, and relatively large composite structure components that reduce the number of separate components required for assembly. Furthermore, methods are provided for fabrication of composite structure shells on a tool having an outer surface representing the inside surface of the fabricated structure to achieve minimum labor content.

Various embodiments of the disclosed method and apparatus are directed to structural designs, manufacturing processes, and tooling systems capable of producing composite structures at minimum cost and weight. In a typical embodiment, this disclosure is directed to fabrication of aircraft fuselage components. However, it will be understood with benefit of this disclosure that other embodiments of the disclosed method and apparatus are possible, including fabrication of aircraft components other than fuselage parts, and fabrication of structures for other types of aircraft and nonaircraft vehicles, and other types of structures. It will also be understood that hollow or closed shaped structures having non-circular cross sections, solid or only partially hollow structures, and/or structures having separate axial halves may also be constructed using one or more of the disclosed features. The disclosed method and apparatus offer particular advantages to those structures that benefit from the characteristics of light weight, strength and/or increased interior clearance and volume.

Advantageously, using the disclosed method and apparatus, relatively large single piece full cylinder composite structures may be manufactured including, for example, a single piece aircraft fuselage component including a nose section and a constant section. By "full cylinder" or "continuous skin" it is meant that the cross sectional diameter of a tubular or other hollow shaped structure is constructed in a single continuous piece (or hoop) without any axial joints. By "constant section" it is meant the part of a structure where the diameter is constant over the entire length. In such an embodiment, two composite laminated fuselage components, including a single-piece forward section, may be cured at an elevated temperature and pressure and then joined with a circumferential splice at the aft end of the constant section. In further embodiments, large full cylinder components may be manufactured in a laminate composite sandwich to form a one-piece cylinder sandwich structure. Because components are of full cylinder construction, problems and costs associated with half section mating are eliminated. In addition, material waste during trimming and fitting is greatly reduced over conventional methods.

FIG. 1 shows the basic configuration of one embodiment of an aircraft fuselage which may be constructed using the methods and apparatus of the present disclosure. In this case, the overall fuselage is about 70 inches in diameter and is fabricated in two sections. The forward section 10 is about 24 feet long while the aft section 12 is about 12 feet long. The forward section includes both a nose section 10a of about 10.5 feet in length and a constant section 10b of about 13.5 feet in length. In this embodiment, forward section 10 and aft section 12 are fabricated separately and then joined or mated at joining area 11, typically using a splice band.

Although FIG. 1 depicts a two-piece aircraft fuselage having a particular shape, size, and configuration, it will be understood with benefit of the present invention that other shapes, sizes and configurations of aircraft fuselages and other structures may be constructed. It will also be understood that an aircraft fuselage or other vehicular or non-vehicular structure constructed using the disclosed method and apparatus may be a single piece structure or a multiple piece structure having more than two sections. Specific examples of other types of aircraft components that may be fabricated include, but are not limited to flap panels. Specific types of other vehicular structures that may be fabricated include, but are not limited to space vehicle structures, automobile structures, train structures, and boat structures.

Figure 2:
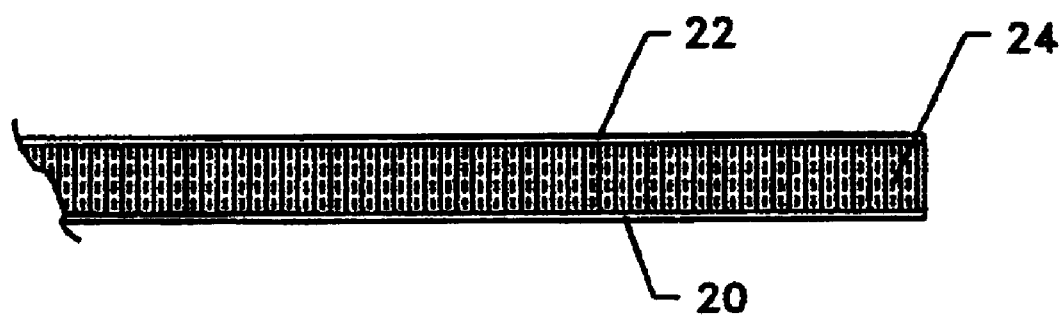
FIG. 2 is a cross-sectional view of a composite body wall having a sandwich construction according to one embodiment of the disclosed method and apparatus.

In the practice of the disclosed method, composite structures may be fabricated using automated fiber placement of filaments (or tows), or by other processes, including but not limited to fiber placement, filament winding or hand layup. Using fiber placement methods, composite materials may be laid up to form composite structures of single or multiple laminations. In the embodiment illustrated in FIG. 1, an aircraft fuselage structure is typically fabricated to be of a sandwich construction as shown in cross-sectional view in FIG. 2. However, other types of composite bodies may be fabricated to be of such a sandwich construction. In the embodiment of FIG. 2, the composite shell has a cross-section that includes an inner skin 20, a honeycomb core 24, and an outer skin 22. In non-reinforced areas, inner skin 20 is typically of a thickness of from about 0.024 inches to about 0.034 inches, most typically about 0.024 inches. Core 24 has a typical non-reinforced thickness of from about 0.70 inches to about 0.75 inches, most typically about 0.71 inches. Outer skin 22 is a mirror image of the inner skin. The total non-reinforced sandwich thickness for this application is typically constant, for example, at about 0.810 inches. It will be understood with benefit of this disclosure that the thickness of any or all three layers may be thicker or thinner than those dimensions given above. The thickness of any or all of these three layers may also be varied for purposes of local reinforcement or rigidity, and if desired in such a manner that the overall wall or sandwich thickness remains constant.

The above described embodiment allows, for example, a frameless aircraft fuselage body to be produced that is designed for a pressure differential of from about 8 psi to about 16 psi, most typically about 8.4 psi. In this example, the fuselage body typically has a maximum exterior diameter of about 70 inches and maximum interior diameter of about 68.4 inches. This translates to a typical interior width of between about 4 inches to about 5 inches greater, and an interior volume of about 13% greater, than a comparable aircraft fuselage body having a similar outer diameter and utilizing frame and longeron construction. In the embodiment of FIGS. 1 and 2, two separate fuselage components are typically fabricated and assembled to produce an aircraft fuselage, for example, having an maximum interior height of about 5.8 ft, a maximum interior width of about 5.8 ft, and an interior length of about 13.5 ft. Although one aircraft fuselage embodiment having particular construction details and dimensions is shown and described above, it will be understood with benefit of the present disclosure that other fiber placed and/or composite structure embodiments having varying shapes, dimensions, and construction designs are also possible.

As will be described below, frame details may be used to close out the sandwich at openings for doors and windows, and local reinforcements may be added within the sandwich as necessary to provide adequate strength for distributing loads such as occur at points where the wing joins the composite shell. Although FIG. 2 illustrates a three-layer sandwich laminated composite cross-section having two skin layers and one core layer, it will be understood with the benefit of the disclosed method that a laminate composite cross-section may include only one layer, or may be a sandwich having four or more layers. In addition it will be understood that any combination of skin and core layers may be employed including for example, more than one core and greater or less than two skin layers.

In the practice of the disclosed method, any suitable fiber or tow material for forming composite structures using tow or fiber placement technology may be employed. Such materials include, but are not limited to, graphite, glass, "KEVLAR", or combinations thereof, with a matrix material, such as epoxy, polyester, bismaleimide, polyimide phenolic, or mixtures thereof. In the embodiment illustrated in FIGS. 1 and 2, skins 20 and 22 are typically a combination of carbon fiber/epoxy prepregs applied in tape, fabric, and continuous towpreg forms. Prepreg is a term commonly used to refer to pre-impregnated. Specific examples of such carbon fiber/epoxy prepregs include "5276-1" and "195/P3" available from CYTEC. Although epoxy resins, such as "5276-1", are typically employed, other resins may be used including, but not limited to "8552-1", "E7K8", "E7T1-2". Most typically, a high strength carbon fiber with a toughened epoxy resin is employed. In addition, skins 20 and 22 may have local reinforcements that are typically constructed of one or more plies of fabric, tape or towpreg applied in a size and orientation dictated by the loading condition. Metallic reinforcements, such as thin titanium sheet may also be laminated into the structure, if desired.

As previously described, skins 20 and 22 are typically fabricated using automated fiber placement techniques, while honeycomb core 24 may be fabricated in a number of ways, including in metallic form using, for example, aluminum, stainless steel or titanium foils, or in composite form using, for example, glass fabric, graphite fabric, or "KEVLAR" material in the form of "NOMEX." Typically, honeycomb composite cores employ phenolic resin matrix material. Typically, honeycomb core 24 is made from "NOMEX" available from, for example, Hexcel, Plascore, and Ciba-Geigy.

Although FIG. 2 illustrates an embodiment of the sandwich cross-section having a honeycomb core and two carbon fiber/epoxy skins, it will be understood with benefit of the present disclosure that a core may be of another material or construction including, but not limited to any relatively low density material suitable for transferring shear loading between skins 20 and 22. Such other materials include, but are not limited to, rigid foam and balsa wood.

A. Fabrication of Composite Structures

In the disclosed method, composite structures are typically manufactured using automated fiber placement methods, but may also be fabricated using various other processes, including but not limited to fiber placement, filament winding or hand layup. When using automated fiber placement methods, a band, typically consisting of up to 24 individual strands of a unidirectional carbon/epoxy prepreg may be applied or wound under tension onto the surface of a tool, such as a mandrel. Individual strands are typically 6 K and have a width of from about ⅛ inch to about ¼ inch, most typically about ⅛ inch. These tow strands typically contain about 136 gm/m² of carbon fiber and have a resin content of about 38% by weight. This tow configuration yields a thickness of about 0.005 inch. However, other types of tows including, but not limited to, 1K–12K towstrands may also be used. Advantageously, use of fiber placement is significantly faster and more accurate than traditional hand layout of composite material. In the practice of the disclosed method, fiber placement is typically performed using a fiber placement machine, such as a "SEVEN AXIS VIPER" available from Cincinnati Milacron. Among the other machines suitable for such fiber placement include machines produced by Ingersol. Advantageously, use of such fiber placement machines with the methods of the present disclosure allows fabrication of parts having varying and complex structural characteristics, such as aircraft fuselage parts and other aircraft components in large single pieces. Computer controls used with these machines are capable of stopping and re-initiating application of fiber strands and of leaving necessary openings in a part, so that the openings do not have to be later formed in the part in separate steps. In addition, design changes may be easily implemented by changing the computer instructions.

Mandrel

Figure 3:
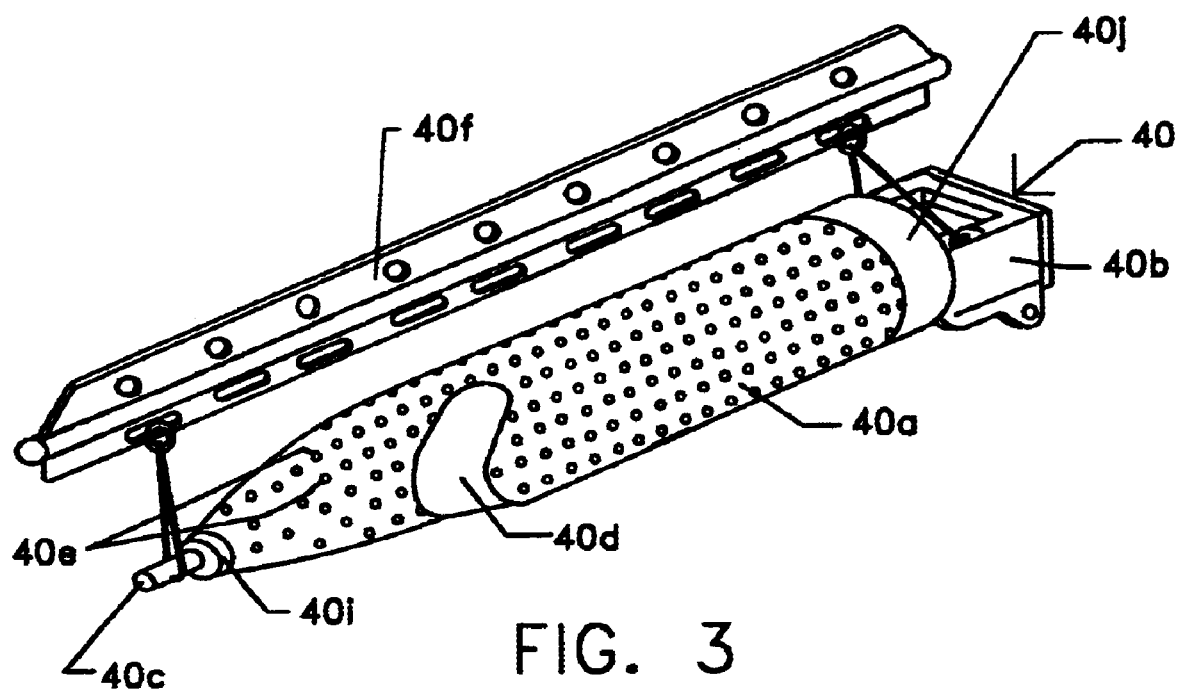
FIG. 3 is a perspective view of a mandrel body according to one embodiment of the disclosed method and apparatus.

In the practice of the disclosed method, tubular and other hollow composite structures are formed by placement of material on the outside surfaces of a form, commonly referred to as a mandrel. Material may be placed using automated fiber placement methods or other processes, including but not limited to fiber placement, filament winding or hand layup. FIG. 3 shows one embodiment of a mandrel body 40 suitable for manufacturing a forward aircraft fuselage section. As shown in FIG. 3, mandrel 40 typically includes a mandrel shell 40a, an aft mandrel support structure 40b, and a forward mandrel shaft 40c. Mandrel shell 40a includes outline for windshield location feature 40d, smooth surface feature 40j, and smooth surface feature 40i. These features are for sealing the bladder/caul sheet 42 to the mandrel shell surface.

Also shown in FIG. 3 are mandrel fluid openings 40e which are connected to a mandrel body fluid system (not shown). Mandrel body fluid system typically includes at least one fluid source and/or vacuum source, and one or more fluid supply lines coupled to mandrel fluid openings 40e and located within mandrel shell 40a. Although a plurality of fluid openings 40e are illustrated, it will be understood with benefit of the present disclosure that as few as one fluid opening may be employed, especially in the fabrication of smaller structures. The mandrel body fluid system may also include one or more fluid supply manifolds and control valves located within mandrel support structure 40b for controlling flow of fluid and/or vacuum to the fluid openings 40e. The mandrel body fluid system and mandrel fluid openings 40e may be collectively referred to as a mandrel body or mandrel fluid system. As described below, the mandrel body fluid system is used for facilitating composite structure removal from mandrel 40 following composite material placement.

Manifold shell 40a may be constructed of any material suitably rigid for forming a tool or base for fiber placement of composites including, but not limited to aluminum, steel, or composite materials. Typically, manifold shell 40a is constructed of aluminum. Aft mandrel support structure 40b and forward mandrel shaft 40c are constructed of any materials suitable for supporting mandrel shell 40a, such as from a fuselage mandrel sling 40f as shown in FIG. 3. Aft manifold support structure 40b and forward mandrel shaft 40c are also typically configured to mate with other machine components used in the manufacture of a composite structure, as described below.

Although FIG. 3 shows a mandrel body of appropriate shape for forming an aircraft fuselage composite structure, it will be understood with benefit of this disclosure that mandrel bodies having shapes suitable for forming other aircraft fuselage designs, as well as other aircraft and non-aircraft components may also be used. It will also be understood that other mandrel construction designs may be employed. For example, a collapsible mandrel may be employed with any aspect of the disclosed method and apparatus in the fabrication of an aircraft fuselage component (that is, a mandrel for forming both forward and aft sections of the fuselage in one piece).

In the embodiment of FIG. 3, fuselage mandrel body 40 is typically about 34 feet long. Forward mandrel shaft 40c and aft mandrel support feature 40b are configured to fit into respective tail stock and head stock mounts of a fiber placement machine. In this way mandrel body 40 is placed in a fiber placement machine in a manner similar to mounting in a lathe. During fabrication of the composite structure, mandrel body 40 is rotated back and forth as the payoff head of a fiber placement machine applies a band of prepreg strands at the selected orientation and location.

Mandrel Body Fluid System

As described above, one embodiment of mandrel body 40 includes a fluid floatation system built into mandrel shell 40a to provide a means of pumping fluid between the mandrel and bladder during the bladder/caul sheet removal process. In a typical embodiment, there are a series of fluid holes or openings 40e drilled through mandrel shell 40a in a pattern distributed over the entire surface of mandrel 40a as illustrated in FIG. 3. Typically, fluid holes 40e are circular, having a diameter of from about 1/16 inch to about 1/4 inches and are connected to 1/8 inch to 1 inch fluid supply lines disposed within mandrel shell 40a. In a most typical embodiment, approximately 250 circular holes 40e of about 1/8 inch diameter are connected with 1/8 inch fluid supply lines that are manifolded together in a way such that holes 40e may be selectively coupled to a vacuum source or pressurized fluid source, such as pressurized air or another suitable pressurized gas such as nitrogen, or a suitable liquid such as soapy water (which helps reduce friction). Fluid supply lines, fluid supply manifolds, and fluid control valves are constructed of suitable materials known in the art, typically those capable of withstanding pressures of from about 50 psi to about 500 psi. It will be understood with benefit of this disclosure that the mandrel body fluid system may comprise a greater or lesser number of openings than that described above. In addition, it will also be understood that openings 40e may be of shape and size other than that described above, including, for example, openings that are oval, rectangular, slot-shaped, etc. As described below, a vacuum source may be used during fiber placement to secure a bladder tightly against the mandrel surface so that it cannot move relative to the mandrel, while pressurized fluid is typically used to facilitate removal of a composite part and bladder from mandrel body 40 after fiber placement.

Bladder and Caul Sheet

As described below, one embodiment of the disclosed method and apparatus employs a bladder with integral caul sheet section(s) that advantageously serves multiple functions. These functions include providing an inner seal for curing fiber placed parts, providing a smooth outer surface for forming smooth fiber placed part inner surfaces, and providing locating features for critical details, such as openings and other features formed in a fiber placed part structure such as an aircraft fuselage. Although typically employed in combination with caul sheet surfaces to form an integral bladder/caul sheet, it will be understood with benefit of the present disclosure that embodiments of the disclosed method and apparatus described herein may be practiced utilizing, among other things, a bladder without caul sheet sections, a bladder in conjunction with separate (non-integral) caul sheet sections, or a bladder in conjunction with different sets of interchangeable or detachable caul sheet sections. A bladder with or without integral or non-integral caul sheet sections may be employed with automated fiber placement methods or with various other processes, including but not limited to, fiber placement, filament winding or hand layup.

In one embodiment of the disclosed method, a flexible membrane or bladder is employed between mandrel shell 40a and a fiber placed body formed by fiber placement. This flexible membrane serves several purposes, among which include forming an intermediate material to facilitate removal of an uncured fiber placed body (or composite layup) part from mandrel 40. The membrane also functions to seal the inside of a structural composite from the atmosphere within an autoclave and to transmit pressure (or compressive force) uniformly to the uncured composite laminate body during curing, as described below.

Figure 4:
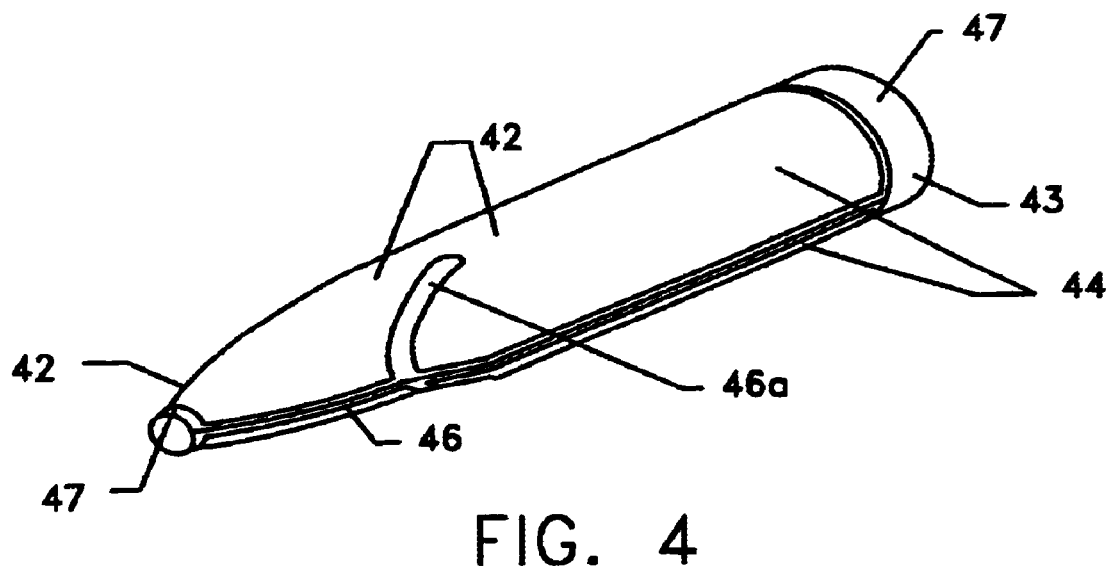
FIG. 4 is a perspective view of an integral bladder/caul sheet according to one embodiment of the disclosed method and apparatus.

FIG. 4 illustrates one embodiment of a flexible membrane device used in the disclosed method and referred to as an integral bladder/caul sheet 42. As shown in FIG. 4, a flexible membrane or bladder 43 is typically tubular and is designed to have a shape and dimensions complementary to the outer surface of a tubular shaped mandrel shell 40a so that it may be indexed and fit directly on the surface of the mandrel shell 40a like the finger of a glove. Indexing is typically accomplished by providing matching holes in the bladder/caul sheet 42 and mandrel 40. The bladder 43 is slipped over the mandrel 40 and the matching holes aligned. A tooling pin is then inserted through these holes and left there until the bladder/caul sheet 42 is removed from the mandrel 40.

There are typically two pins provided at the aft end and two pins provided at the forward end. Although mandrel shell 40a is depicted having a cylindrical shape, it will be understood with benefit of the present disclosure that a bladder 43, caul sheet section/s 44, and/or integral bladder/caul sheet 42 may be employed with mandrels having virtually any shape suitable for forming composite structures, including, for example, square, rectangular, oval, elliptical, irregular etc.

Typically, bladder 43 is constructed of butyl rubber, although it may be constructed of any suitably stretchable and resilient material including, but not limited to, silicon rubber, nitrile rubber, nylon film, or other elastomers. Also shown in FIG. 4 are caul sheet sections 44. Caul sheet sections 44 are typically relatively thin sheets of material that are placed between the bladder 43 and the uncured structural composite layup in order to smooth out the interior surface of a fiberplaced body that would otherwise conform to the surface of bladder 43. Caul sheet sections 44 may be any suitably smooth and rigid surface for creating an uncured fiber placed structure layup having a substantially smooth inner surface for secondary bonding of details. Typically, each caul sheet section 44 comprises a carbon/epoxy laminate bonded to bladder 43.

However, caul sheet sections 44 may be constructed of any other suitably smooth and rigid or hard-surfaced materials including, but not limited to, fiberglass and aluminum sheet. It will be understood with benefit of this disclosure that any number of caul sheet sections may be employed, including one section or more than two sections. It will also be understood that a caul sheet section 44 may be coupled or bonded to a bladder 43 in any suitable manner, including by pre-fabrication and attachment with adhesive, or by laying up uncured rubber and uncured prepreg fabric in a mold and then co-curing them together. As mentioned above, however, a bladder 43 may be employed with no caul sheet sections, or with non-integral or interchangeable caul sheet sections in the practice of the disclosed method and apparatus.

Integral bladder/caul sheet 42 is configured to extend forward and aft of a fabricated composite structure so that it may be sealed directly to clamshell molds which are used during cure of the composite fiber placed body part as described below. As shown in FIG. 4 in this embodiment caul sheet sections 44 are typically carbon/epoxy laminates that cover most of the surface of rubber bladder 43 except for expansion spaces 46 (in this case, located at the top and bottom center lines of the mandrel body) and at end spaces 47 (located at the forward and aft ends of bladder 43). Expansion spaces 46 are zones where there is only rubber, thereby providing an expansion joint that allows a fiber place shell to expand out against clam shell molds during a curing process. In addition to expansion joints 46 located at the center line areas of the bladder 43, additional expansion spaces 46a may be positioned where local contour changes occur. In this embodiment, expansion spaces 46 and 46a are about 12 inches in width, however, it will be understood with benefit of the present disclosure that spaces having any width suitable for allowing expansion to occur may be employed. Because the entire inner surface of rubber bladder 43 is a continuous layer of rubber that mates tightly and securely with the outer surface of mandrel 40, the bladder/caul sheet 42 provides rubber and carbon/epoxy layers laminated together to provide a continuous vacuum impervious shell.

In one embodiment, caul sheet sections 44 are located, laid up, and bonded to the outer mold line ("OML") surface of bladder 43 to provide a smooth bonding surface for secondary bonding of details and other assemblies to the inner mold line ("IML") of fuselage shells. By employing integral caul sheet sections 44, undesirable variations in a fiber placed part that may be formed in manufacturing processes employing only a bladder may be avoided. These variations may be caused in any soft area, such as where two pieces of core unite so that the soft and flexible surface of a conventional bladder tends to deform into the space between the pieces of core, thereby spreading them apart. In contrast to the relatively soft surface of a bladder, the relatively hard surface of caul sheet sections 44 does not tend to deform into soft areas of a part, instead tending to bridge across such soft spots.

Fabrication of bladder 43 and caul sheet sections 44 are typically performed in caul sheet molds as follows. The bladder outline surface is defined as a surface concentric to the OML but at a distance inside the OML equal to the composite part thickness plus an allowance for radial expansion. In the typical embodiment, the composite part thickness is about 0.81 inches and the expansion allowance is about 0.100 inches. In one embodiment, bladder/caul sheet 42 may be constructed using intermediate tools. First, a pair of solid convex forms are machined to the bladder/caul sheet, one representing the left side of the fuselage, the other the right side. On these forms, graphite epoxy shells are hand laid-up and cured. Finally, the two shells are mated together and the bladder/caul sheet laid-up and cured inside them. Typically, both the caul sheet and bladder materials are initially uncured and laid-up simultaneously. During the curing process, typically performed in an autoclave, the materials bonded together to form an integrated laminate (cure temperature of 350° F., cure pressure 100 psi). During fabrication of caul sheet sections 44, scribe lines defining locations of features such as windshields, window and door locations may also be applied. Machined pads are bonded to the caul sheet surface in areas needed for attaching staged detail locators for features such as cabin window frames, cabin door frames, windshield frames, access ports, landing gear doors, etc. Positive locators (removable) may be provided, for example, for the following staged or precured details: windshield frame, window frames, cabin door frames, emergency exit door frames, etc. The outer surface of caul sheet sections 44 typically have reference scribe lines defining ply orientation of first ply down which is hand applied. As described further below, these machined pads are designed to fit into recesses in locator plugs that may be secured to the pads and caul sheet section with any suitable securing device such as screws. The locator plugs are used to position the precured frames and they fill all the space between the bladder/caul sheet and the clam shell molds (two-piece) that is left open by the frame. A removable spacer or plug is provided to occupy the space where a splice ring will be installed when the forward and aft fuselage sections are joined.

Fiber Placement Devices

In the practice of the disclosed method, devices or machines suitable for fiber placement are typically employed to reduce labor and material waste. Any machine suitable for fiber placement may be used. Typically, a fiber placement machine employing a multiple axis numerical control ("NC") system is employed. Such a machine also typically has a head stock and tail stock for receiving forward mandrel shaft 40c and aft mandrel support structure 40b of mandrel 40. For example, a "CINCINNATI MILACRON VIPER FIBER PLACEMENT MACHINE" using NC data generated from "CATIA" model software is employed. Besides "CATIA", any other software suitable for designing and storing numerical data for NC machining parts may be employed. In one embodiment of the disclosed method, a fiber placement machine capable of selective application of 24 rolls of ⅛ inch wide and 5/1000 inch thick slit tape or tow is employed. This allows single pass application of a tape with a maximum width of 3 inches and a minimum width of ⅛ inch. Typically, a machine having a payoff head capable of cutting and restarting individual strands of tape is employed. The payoff head has a conforming roller (typically having 11 individual segments) for application of tape prepreg to a mandrel. Such a machine is also typically capable of controlling the temperature of the tape and roller pressure. In a typical embodiment the machine operates along seven different axes to allow the payoff head to follow the contour of a mandrel, keeping it normal to the mandrel surface during application of prepreg tape. Proper orientation of the payoff head (or tow placement head) in relation to the mandrel is controlled by a computer. Such a machine is also capable of controlling temperature and head roller pressure during application of the tape in order to control quality of the composite material (such as to eliminate voids).

In the practice of the disclosed method, a fiber placement machine is typically provided with a head stock to receive the aft mandrel support structure 40b of a mandrel 40 and the tail stock to receive the forward mandrel shaft 40c of a mandrel 40. The head stock and tail stock are configured to allow the mandrel to be rotated back and forth and at various speeds during fiber placement. Rotation of the mandrel as well as other aspects of the fiber placement system are typically controllable by an NC system, such as one using "ACCRAPLACE" control software (typically available from Cincinnati Milacron with purchase of one of their machines), in conjunction with design software, such as "CATIA".

Although a typical fiber placement machine and NC system have been described above, it will be understood with benefit of the present disclosure that any fiber placement machine suitable for application of prepreg tow to a mandrel may be employed. Further, the structure described herein could be fabricated entirely by hand layup techniques and/or designed using non-computerized manual design techniques known to those of skill in the art.

Clam Shell Molds

Figure 5:
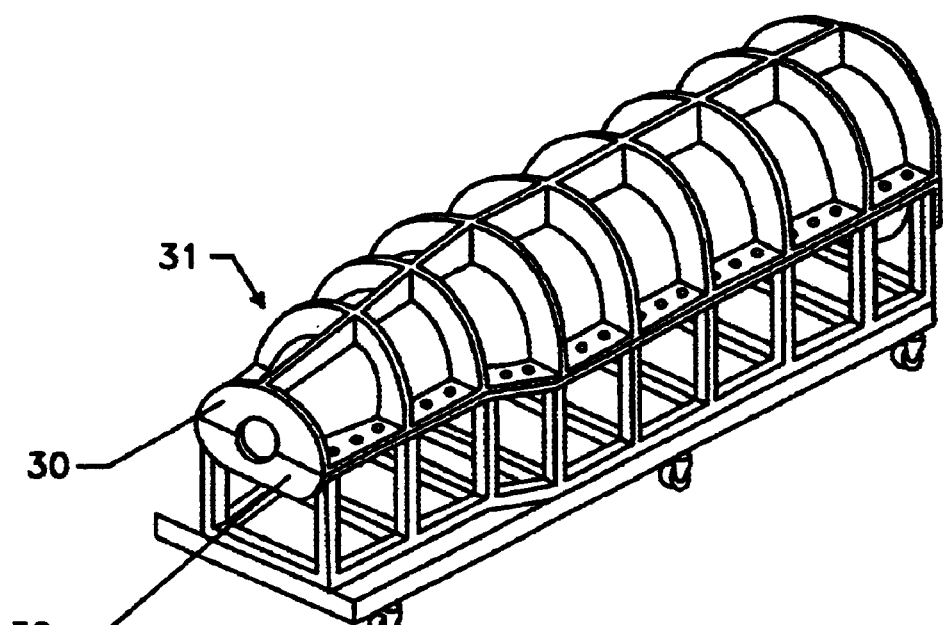
FIG. 5 is a perspective view of a clam shell mold according to one embodiment of the disclosed method and apparatus.
Figure 6:
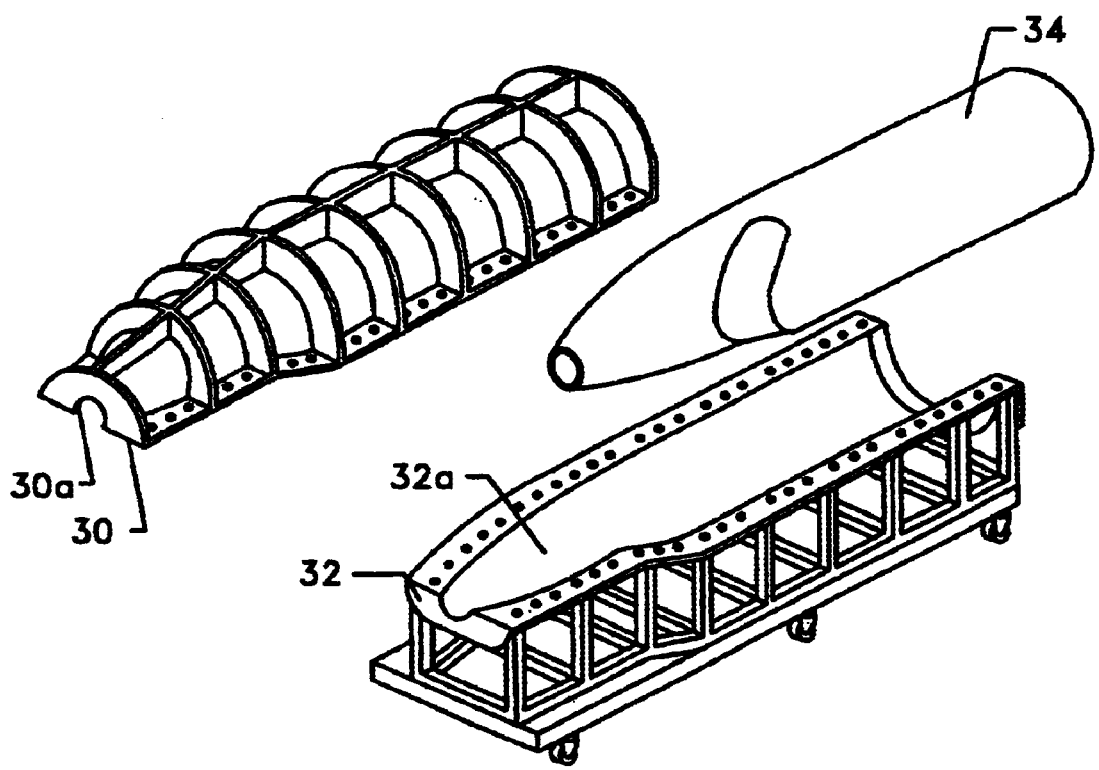
FIG. 6 is a perspective view of a forward composite fuselage section and clam shell mold halves according to one embodiment of the disclosed method and apparatus.
Figure 7:
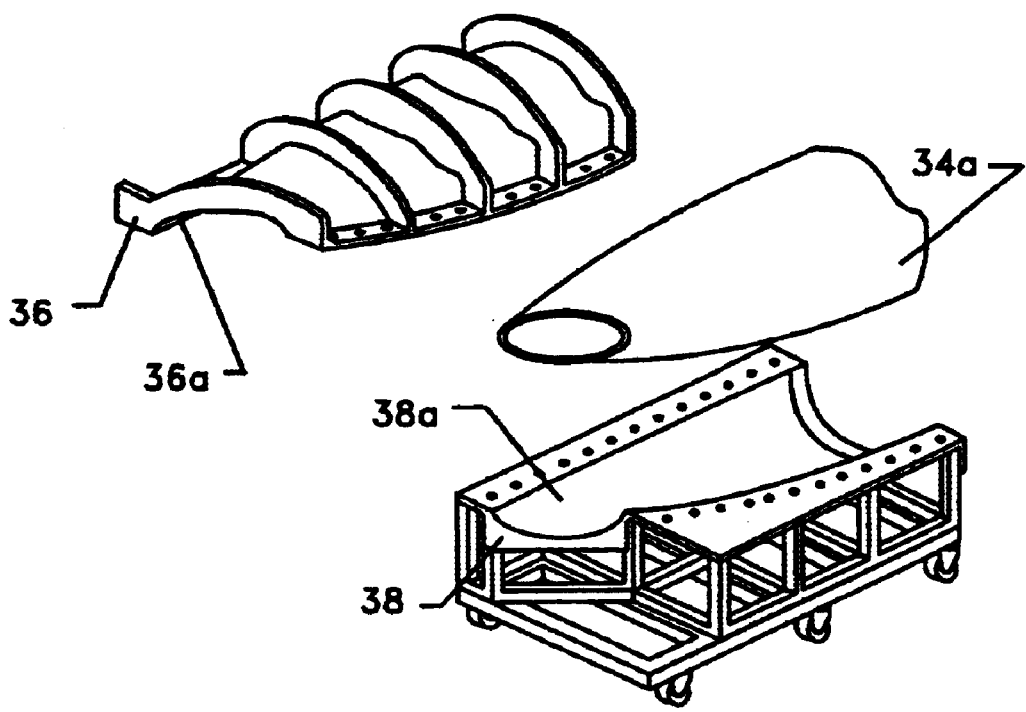
FIG. 7 is a perspective view of an aft composite fuselage section and clam shell mold halves according to one embodiment of the disclosed method and apparatus.

For molding and curing of a composite component, such as a fuselage, a clam shell mold 31 is typically employed as shown in FIG. 5 (in this case, for the forward section of an aircraft fuselage that is about 25 feet in length). Clam shell mold 31 typically includes two mold halves 30 and 32 in which an uncured composite body (such as a fuselage) may be placed to cure. After curing, the cured composite part may be removed from the mold, as shown in FIG. 6. FIG. 7 shows clam shell mold halves 36 and 38 for aft composite fuselage section 34a.

In the illustrated embodiment, clam shell mold halves 30, 32, 36, and 38 provide a rigid form upon which soft, pliable, uncured composite materials may be placed and supported during a curing process, which is typically carried out under controlled and elevated temperate and pressure. Inner surfaces 30a, 32a, 36a, and 38a of the clam shell molds are developed to provide a surface for molding the outer loft surface of a fuselage, and therefore need to be as accurate and smooth as possible. Advantageously, split clam shell molds as those shown in FIGS. 6 and 7 allow composite parts, such as fuselage shells, to be made without an axial splice. FIG. 7 illustrates how a clam shell mold may be split along the top and bottom vertical center lines in order to remove a part after cure.

Figure 8:
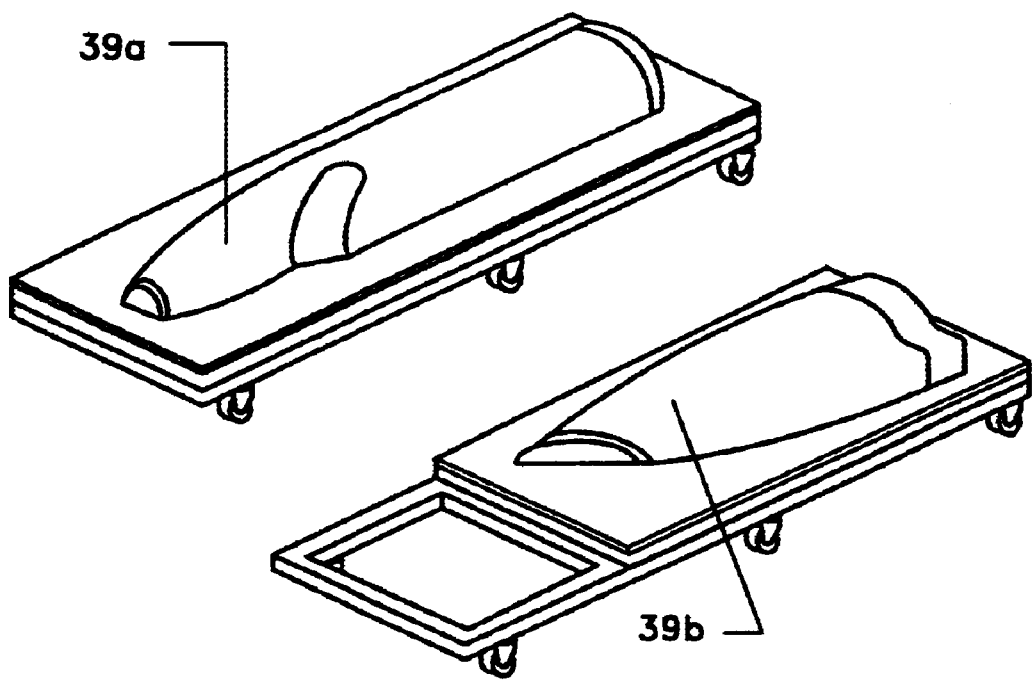
FIG. 8 is a perspective view of molds for manufacturing clam shell mold halves according to one embodiment of the disclosed method and apparatus.

Typically, clam shell mold halves 30, 32, 36, and 38 are made of carbon/epoxy tooling fabric. This material is desirable for this embodiment because it has substantially the same thermal coefficient of expansion as fuselage shells 34 and 34a which are typically made of carbon/epoxy. In manufacture, clam shell molds 30, 32, 36, and 38 are typically laid up on aluminum molds which have been NC machined to the contour of a fuselage outer mold line, although other mold materials are possible. One example of such aluminum molds 39a and 39b is shown in FIG. 8. Using aluminum molds 39a and 39b, carbon/epoxy clam shell molds 30, 32, 36, and 38 may be manufactured using graphite epoxy tooling prepreg which cures at a lower temperature (typically, about 120° F.) than prepreg material for manufacturing fuselage composite sections. Clam shell molds 30, 32, 36 and 38 are then laid up on aluminum molds 39a and 39b and cured in an autoclave. It will be understood that clam shell molds may also be made of any other material suitable for molding, such as glass fabric/epoxy, that is compatible with materials of the composite part being built.

In operation, respective halves of a clam shell mold are typically held together with clamps during molding and curing of a composite part section. These mold halves are typically configured to create a clearance of between about 0.010 inches and about 0.100 inches, most typically about 0.060 inches, between the interior surface of the mold halves and exterior surface of an uncured and unexpanded fiber placed part. Seals are typically provided for sealing the integral bladder/caul sheet combination 42 of FIG. 4 around a fuselage composite section 34 to provide a sealed, leak-free system. In this way, a vacuum may be maintained between bladder/caul sheet 42 and the clam shell mold halves during molding and curing, as described below. For example, smooth sealing surfaces are provided at the forward and aft ends of the bladder/caul sheet 42. Similar surfaces are provided on the forward and aft faces and sides of the clam shell halves.

For the purpose of expanding the fiber placed shell the bladder/caul sheet and clam shells are sealed together by placing a sticky sealant tape on the smooth seal surfaces and covering the area between the surfaces with a flexible membrane that is impermeable (usually a commercially available nylon film). A vacuum pump is plumbed to a port(s) mounted on the clam shells and the air, or then gaseous or fluidized material evacuated from the sealed volume between the bladder/caul sheet and clam shell molds. When this is done, the atmospheric pressure outside the sealed volume is higher than inside and tends to push the bladder/caul sheet and clam shells together. Since the bladder rubber area is stretchable and the fiber placed fuselage shell is in an uncured state at this point, the external pressure tends to expand the bladder/caul sheet out towards the rigid clam shells. Depending of the efficiency of the vacuum pump the differential pressure may be as much as about 15 pounds per square inch of area (although less vacuum is acceptable). The net effect of this pressure is to expand the caul sheet away from the mandrel surface thus allowing the mandrel to be extracted. The sealing materials, sticky sealant tapes and nylon film are disposable and are usually replaced after each use.

Reusable or Permanent Bag

Figure 15:
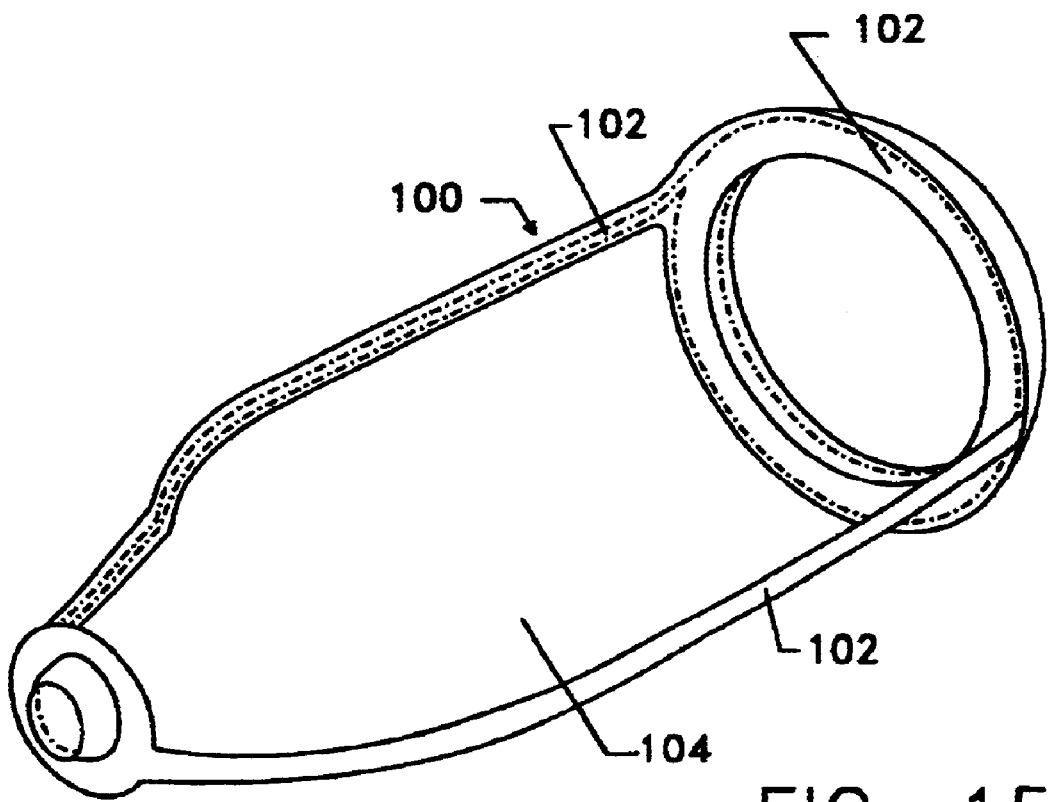
FIG. 15 is a perspective view of a reusable bag according to one embodiment of the disclosed method and apparatus.
Figure 16:
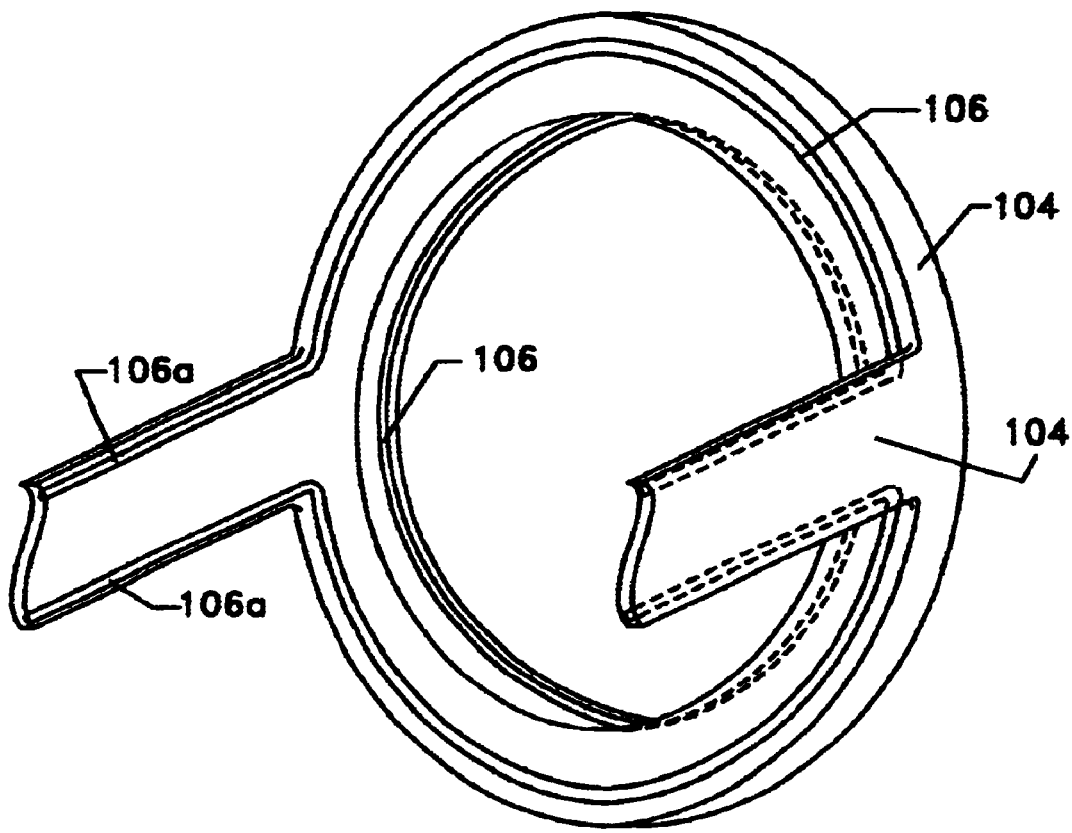
FIG. 16 is a partial perspective view of the aft end of a reusable bag according to one embodiment of the disclosed method and apparatus.
Figure 19:
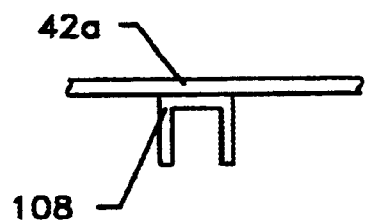
FIG. 19 is a cross-sectional view of a sealing element mounted to bladder/caul sheet surfaces according to one embodiment of the disclosed method and apparatus.
Figure 22:
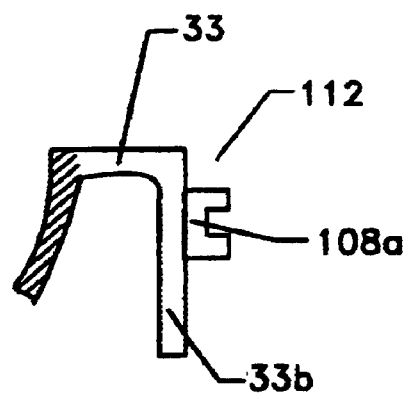
FIG. 22 is a cross-sectional view of a clam shell seal half according to one embodiment of the disclosed method and apparatus.

In another embodiment, when production rates are high enough it may be more economical to accomplish the sealing process described in the previous paragraph using a permanent or reusable bag 100 as shown in FIG. 15. Reusable bag 100 is typically placed over bladder/caul sheet 42 after composite placement. For the reusable bag 100, the sticky sealant tape is replaced with bladder/caul sheet seal halves 108 and clam shell seal halves 108a that are bonded to bladder/caul sheet surfaces 42a and clam shell mold surfaces 33, respectively, as illustrated in FIGS. 19 and 22. As shown in FIGS. 15 and 16, mating bag seal halves 106 and 106a for mating with respective seal halves 108 and 108a are bonded to membrane material 104, which may be of any suitably flexible material such as rubber. Typically, membrane material 104 is a heavier flexible membrane (most typically fitted silicone rubber sheet having a thickness of about 0.125 inches thick). Although one particular embodiment of reusable seal halves 106, 106a, 108, and 108a are illustrated, these seal halves may be any sealing elements suitable for sealing bladder/caul sheet surfaces 42a to clam shell mold surfaces 33. Typically, reusable seals are provided for forming such a sealing function in a manner similar, for example, to the seals on a resealable sandwich bag.

Figure 18:
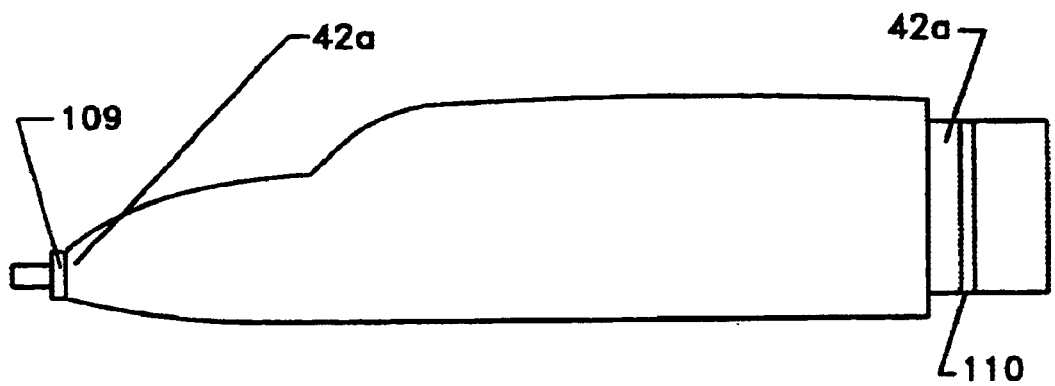
FIG. 18 is a side view of a mandrel and bladder/caul sheet having forward and aft sealing loops according to one embodiment of the disclosed method and apparatus.
Figure 24:
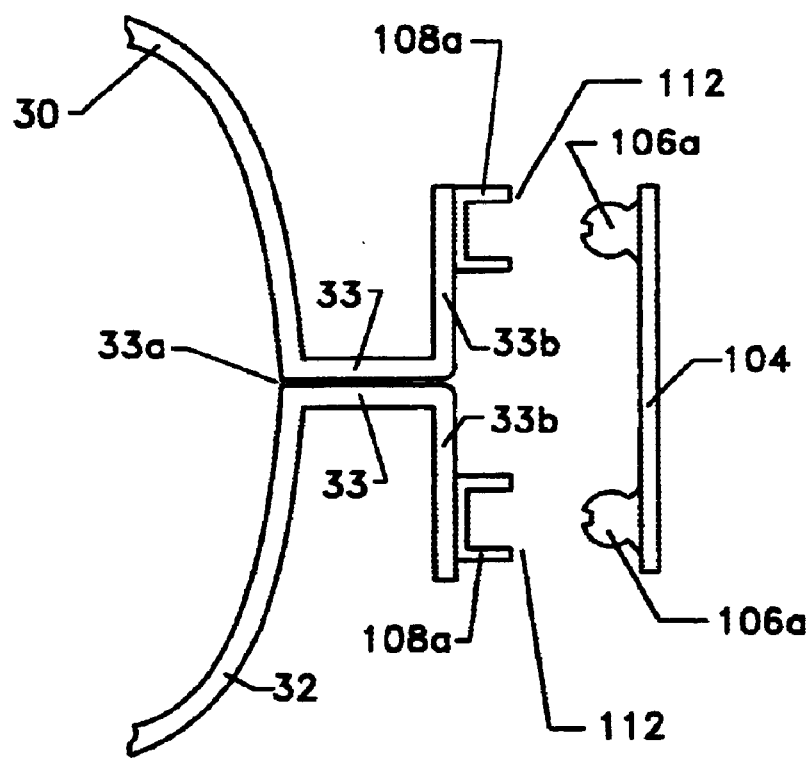
FIG. 24 is a cross-sectional view of a flexible membrane and seal elements juxtaposed with mated clam shell mold halves having corresponding mating seal elements according to one embodiment of the disclosed method and apparatus.
Figure 25:
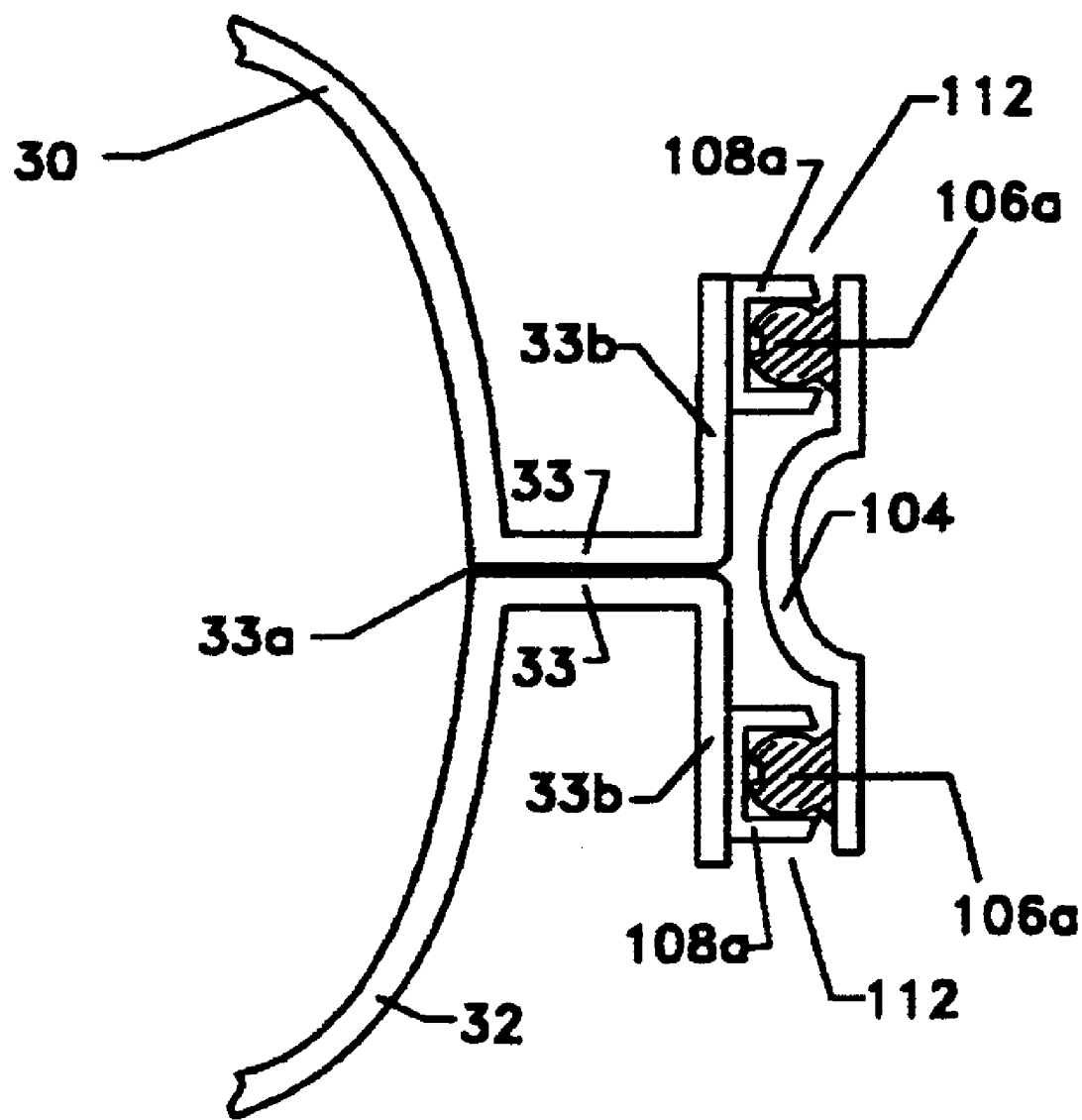
FIG. 25 is a cross-sectional view of a flexible membrane and seal elements disposed in mated relationship with mating clam shell mold halves having corresponding mating seal elements according to one embodiment of the disclosed method and apparatus.

In a most typical embodiment, bag seal elements 106 and 106a may be any suitable reusable seal halves, such as silicon seals available from Bondline Products. Mating seal halves 108 (such as from Bondline Products), may be provided (or bonded) at appropriate mating points on bladder/caul sheet surfaces 42a to form forward bladder/caul sheet seal loop 109 and aft bladder/caul sheet seal loop 110 as shown in FIG. 18. These seal loops make a complete loop around the forward and aft sections of the bladder/caul sheet surface 42a. In a similar fashion, clam shell mold halve surfaces 33 may be provided (or bonded) with mating seal halves 108a (such as from Bondline Products) to form clam shell seal loops 112 as shown for one clam shell mold half in FIG. 21. These seal loops make complete loops around the outside of the clam shell mold surfaces 33 of each mating clam shell mold half such as, for example, by bonding to bath tub flanges 33b as shown in FIGS. 21, 22, 24 and 25. A cross section of clam shell sealing loops 112, showing clam shell seal halves 108a is illustrated in FIGS. 22, 24 and 25. FIG. 25 shows a cross section of an assembled bag 100, with membrane 104 sealed to clam shells 30 and 32 using seal halves 106a and 108a. In this way the bag 100 protects against potential leaks in area 33a between the clam shell mold half mating surfaces 33.

Figure 17:
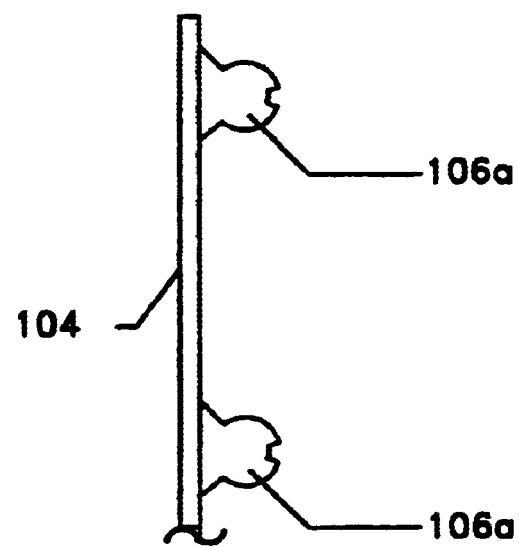
FIG. 17 is a cross-sectional view of a membrane and sealing elements according to one embodiment of the disclosed method and apparatus.
Figure 20:
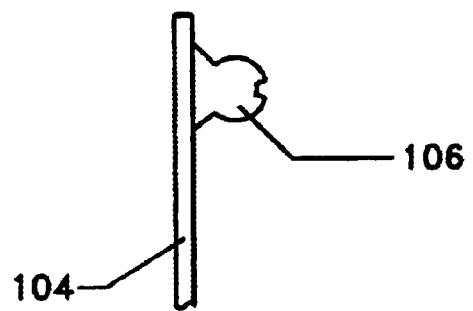
FIG. 20 is a cross-sectional view of a membrane and sealing half according to one embodiment of the disclosed method and apparatus.
Figure 21:
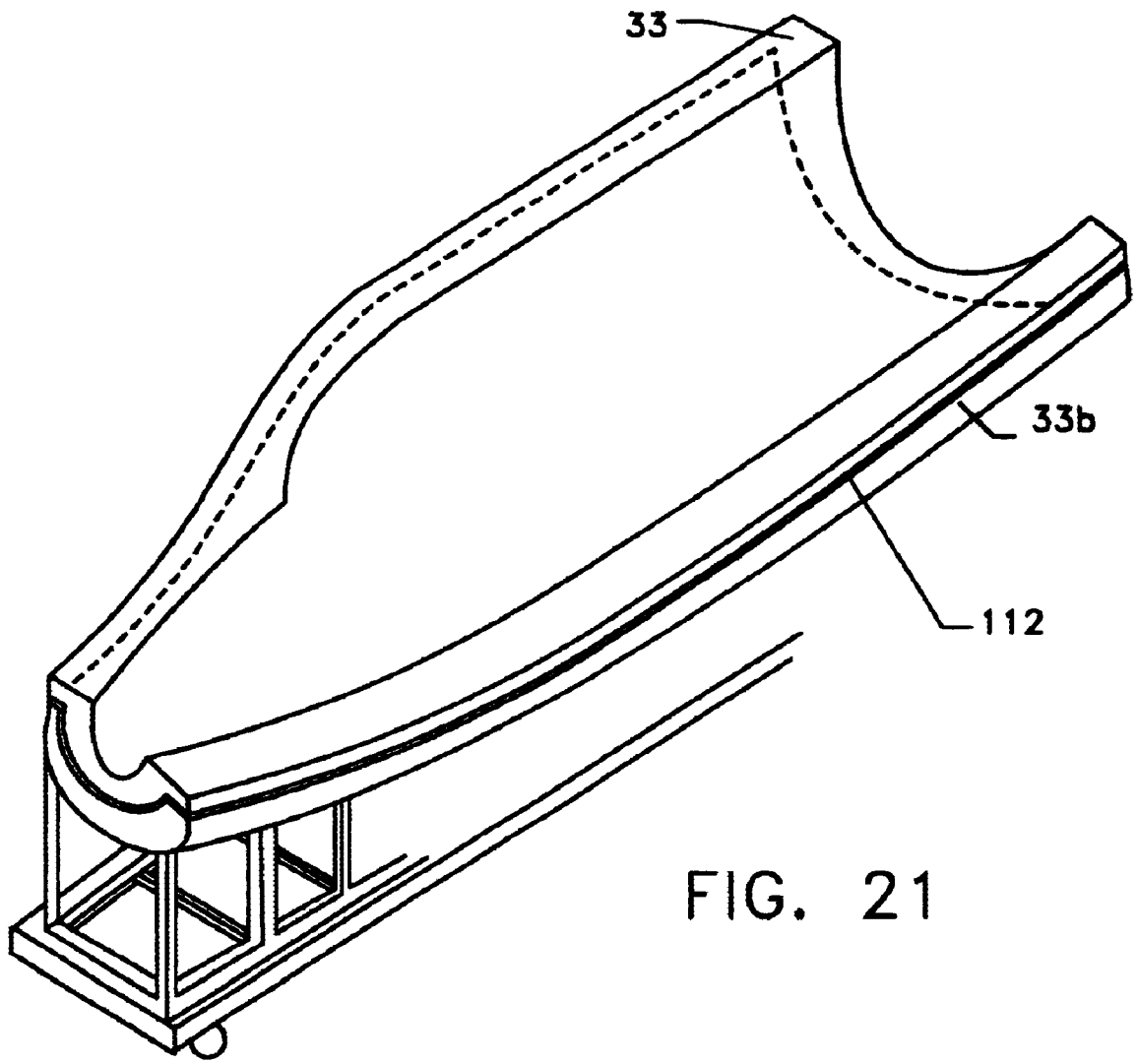
FIG. 21 is a perspective view of a clam shell mold half and clam shell sealing loop according to one embodiment of the disclosed method and apparatus.
Figure 23:
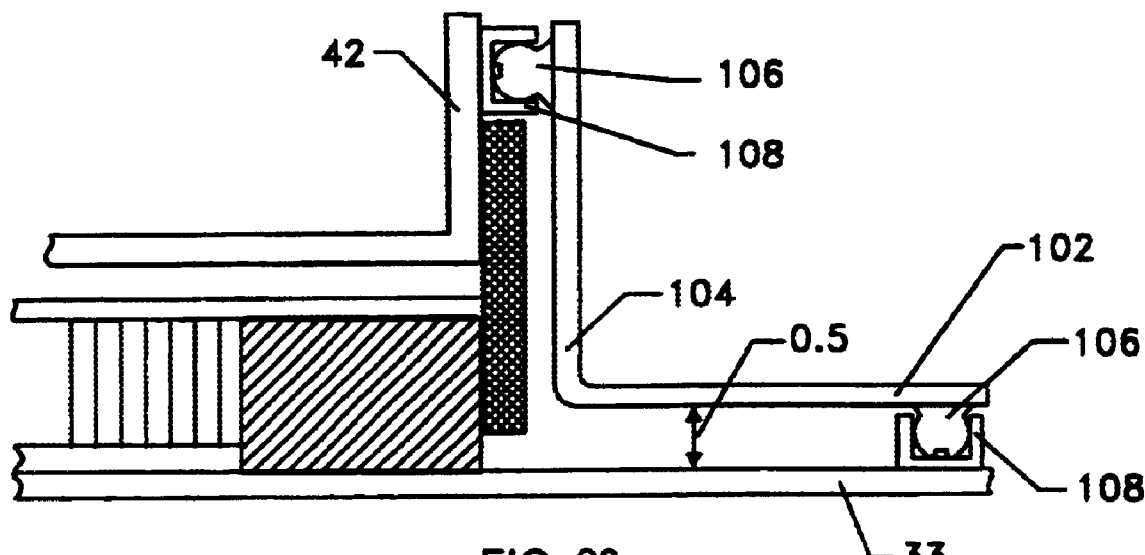
FIG. 23 is a partial cross-sectional view of a bladder/caul sheet sealed to clam shell mold surfaces with mating seal elements according to one embodiment of the disclosed method and apparatus.

A cross section of bag sealing halves 106a and membrane 104 for forming a seal with sealing loops 112 and 112a is illustrated in FIGS. 17, 24, and 25. A cross section of bladder/caul sheet sealing loops 109 and 110, showing bladder/caul sheet sealing halves 108 is shown in FIG. 19. A cross section of bag sealing halves 106 and membrane 104 for forming a seal with sealing loops 109 and 110 is illustrated in FIG. 20. Mating seal elements 106 and 108 may be sealed together so as to create a seal between bladder/caul sheet 42 and clam shell mold surfaces 33, as shown in FIG. 23. Although one embodiment employs seal halves 106 and 106a with male seal profiles, and seal halves 108 and 108a with female seal halves, these profile relationships may be reversed or mixed in any manner desirable. In addition, multiple seal loops and seal loops employing greater than one row of seal halves may also be employed, as may reusable bags having a single unitary seal section or multiple membrane and seal sections. Further, it will be understood with benefit of this disclosure that a sealing bag similar to reusable bag 100 may be constructed to be disposable.

In another embodiment, vacuum within sealed clam shell molds may be provided with a clam shell mold vacuum system including vacuum pump and plumbing.

B. Manufacture of Composite Sections

Figure 9:
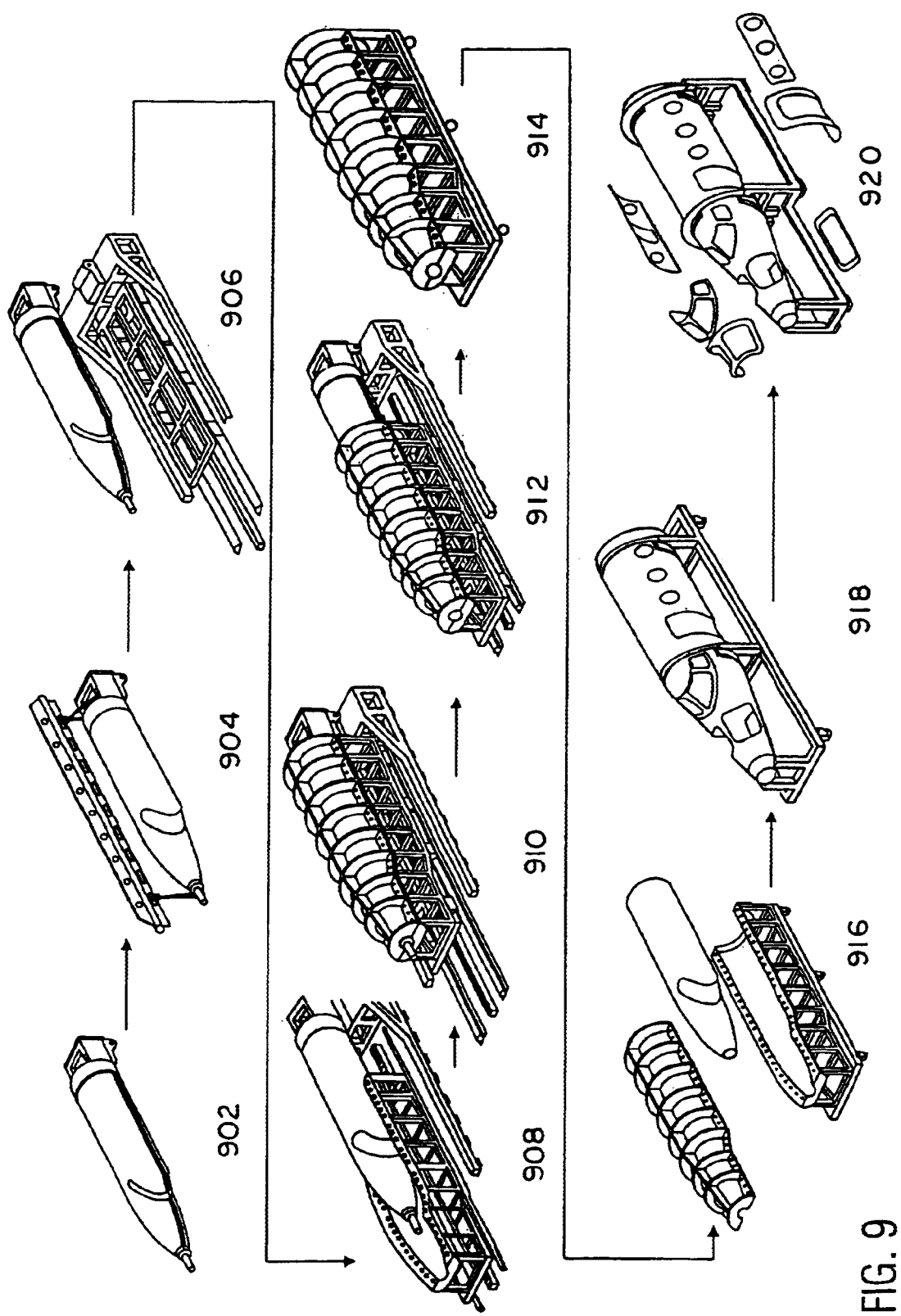
FIG. 9 is a sequential illustrative flowchart showing process steps according to one embodiment of the disclosed method and apparatus.

FIG. 9 graphically illustrates fabrication of a composite part according to one embodiment of the disclosed method and apparatus. Fabrication typically begins with an integral bladder/caul sheet placed on a mandrel body (902) around which fibers are placed (904). Next, clam shell molds are placed around the composite part (906–910) and the mandrel removed (912). The composite section part and clam shell molds are then typically placed in an autoclave for curing (914). After curing, the composite is removed from the clam shell molds (916) for further fabrication steps (such as, for example, those shown in steps 918–920). During manufacture, the steps of fiber placement through curing are typically performed in a clean room. Such a clean room is typically controlled for temperature, humidity and contaminants such as dirt, oils, etc. The following steps are illustrative of one representative embodiment of the disclosed method and apparatus. It will be understood with benefit of the present disclosure, that other embodiments are possible, including those embodiments using fewer, additional and/or differing materials and steps.

Fiber-Placement

In this embodiment, fabrication of a composite fuselage section on a mandrel typically consists of the basic steps of: (1) fiber-placement of an inner skin and reinforcement plys; (2) manual application of small reinforcement plies, pre-staged or C-staged close-out frames for windows and doors, and honeycomb core; and (3) fiber-placement of reinforcement plys. Non-crosslinked C-staged close-out frames are typically employed to facilitate assembly with uncured materials in the clam shell molds. However other staged frames, or no frames at all are also possible.

Figure 10:
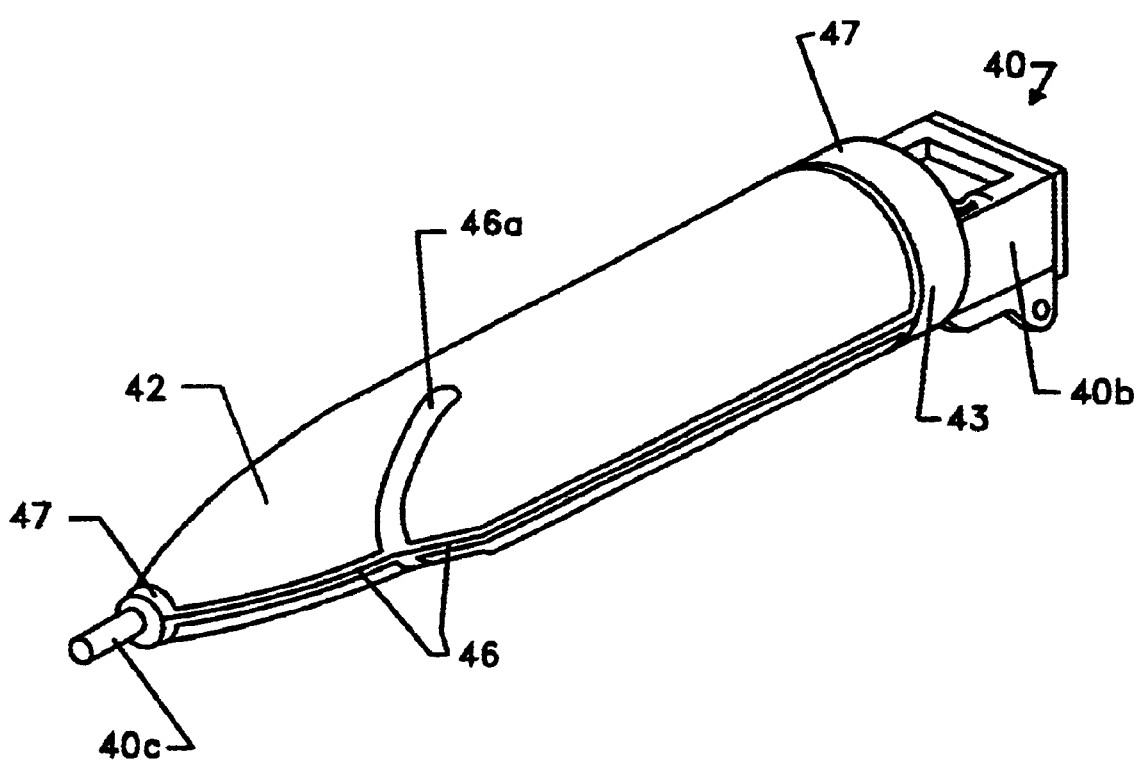
FIG. 10 is a perspective view of an integral bladder/caul sheet installed on a mandrel according to one embodiment of the disclosed method and apparatus.

In this embodiment, a mandrel 40 with installed bladder/caul sheet 42 (as shown in FIG. 10) is installed into a fiber-placement machine such that forward mandrel shaft 40c and aft mandrel support structure 40b are received in tail stock and head stock, respectively, of the fiber-placement machine. Although an integral bladder/caul sheet is typically employed, it will be understood that fiber or composite material placement (by any suitable method) may also be accomplished using a bladder alone or a bladder in combination with non-integral caul sheet sections. Prior to fiber-placement, a vacuum is applied through the mandrel fluid supply system and openings 40e in mandrel 40 so that integral bladder/caul sheet 42 is held tight to the mandrel during fiber-placement. The surface of the bladder/caul sheet has been coated with a material, typically monocoat, that will not stick to the cured fuselage shell. Next, a first ply of inner skin is hand placed onto bladder/caul sheet 42. The first ply of the inner skin is typically a fabric prepreg of about 0.0085 inch/ply with the fabric weave oriented at 45° to the axis of rotation. The first ply fabric prepreg is typically vacuum bagged temporarily to bladder/caul sheet 42 so that it will adhere to it. Then carbon fiber/epoxy slit tape or tow prepregs are placed over the first ply to complete the inner skin 20 using the fiber-placement machine. In this embodiment, inner skin 20, core 24, and outer skin 22 are typically laid up in the thicknesses and dimensions as previously described. When slit tape is employed, it is typically of about 0.125 inch from a parent tape manufactured to have about 136 g/m$^2$ carbon fiber. However, other types and weights of slit tape or prepregs are possible, as are skin constructions having greater or lesser numbers of plies.

In this embodiment, a fiber-placement machine typically applies between 1 and 24 filaments of pliable uncured prepreg tape during placement. Each tape typically has a thickness about 5/1000 of an inch and a width of about 1/8 inch. During fiber placement, mandrel 40 and the fiber placement roller head are moved in relation to each other so that fiber filaments are placed according to computer software (typically, "ACCRAPLACE" control software and "CATIA" design software). Typically, tow filaments or fibers are applied in three basic orientations relative to the longitudinal axis of an elongated composite part (such as a fuselage, so that 0° is oriented in a direction from forward to aft): in an axial direction substantially parallel to the longitudinal axis of the mandrel (most typically about 0° to the longitudinal axis of the mandrel), in a direction at an angle of between about 400 and about 500 (most typically about 45°) to the longitudinal axis of the mandrel, and in a direction roughly perpendicular to the longitudinal axis of the mandrel and coinciding with the outer diameter of the mandrel (or at an angle between about 85° and about 95°, most typically about 90°, to the longitudinal axis of the mandrel). This filament application orientation provides uniform strength and structural integrity to the finished composite part. In applying bands of fibers in the 0° and ±45° directions, the bandwidth is typically narrowed by dropping one or more tows as application moves from larger diameter to smaller diameter sections of a part. Adjacent bands are laid side by side without overlaps to provide a constant thickness ply.

In a composite design including fibers or filaments that are oriented in multiple directions as described above, the filaments or fibers are typically placed so that they form plies of material that are symmetrical about the center of the thickness. This helps ensure that stresses are distributed uniformly so that the composite part won't tend to warp during laminate curing.

During fiber-placement, precured laminate strips or stripping is typically placed in the expansion areas 46 and 46a which exist between separate caul sheet section 42 as shown in FIG. 10. These precured laminate strips serve to act as a filler or bridge in those areas where no caul sheet material exists. Most typically these laminate strips are of a thickness substantially equivalent to the thickness of a ply of fabric. After fiber-placement, these precured strips become part of the composite section part.

In one embodiment of the disclosed method, the detailed design of the plies in the inner skin 20 is adjusted so that circumferentially directed fibers (those laid out at about 90°) are cut and overlapped at opposite sides of a composite section ply to form a continuous full cylinder skin having two integral sections. Tow or tape plies placed in the direction of the axis of rotation are typically not overlapped since they offer little resistance to circumferential growth, however, any plies applied more than from about 10° to about 15° away from the axis of rotation should be overlapped in a similar manner. In the case of a composite part, such as a fuselage, adjacent (or side by side) plies are typically laid out to form an expansion area oriented substantially parallel to the longitudinal axis of the part.

Figure 11:
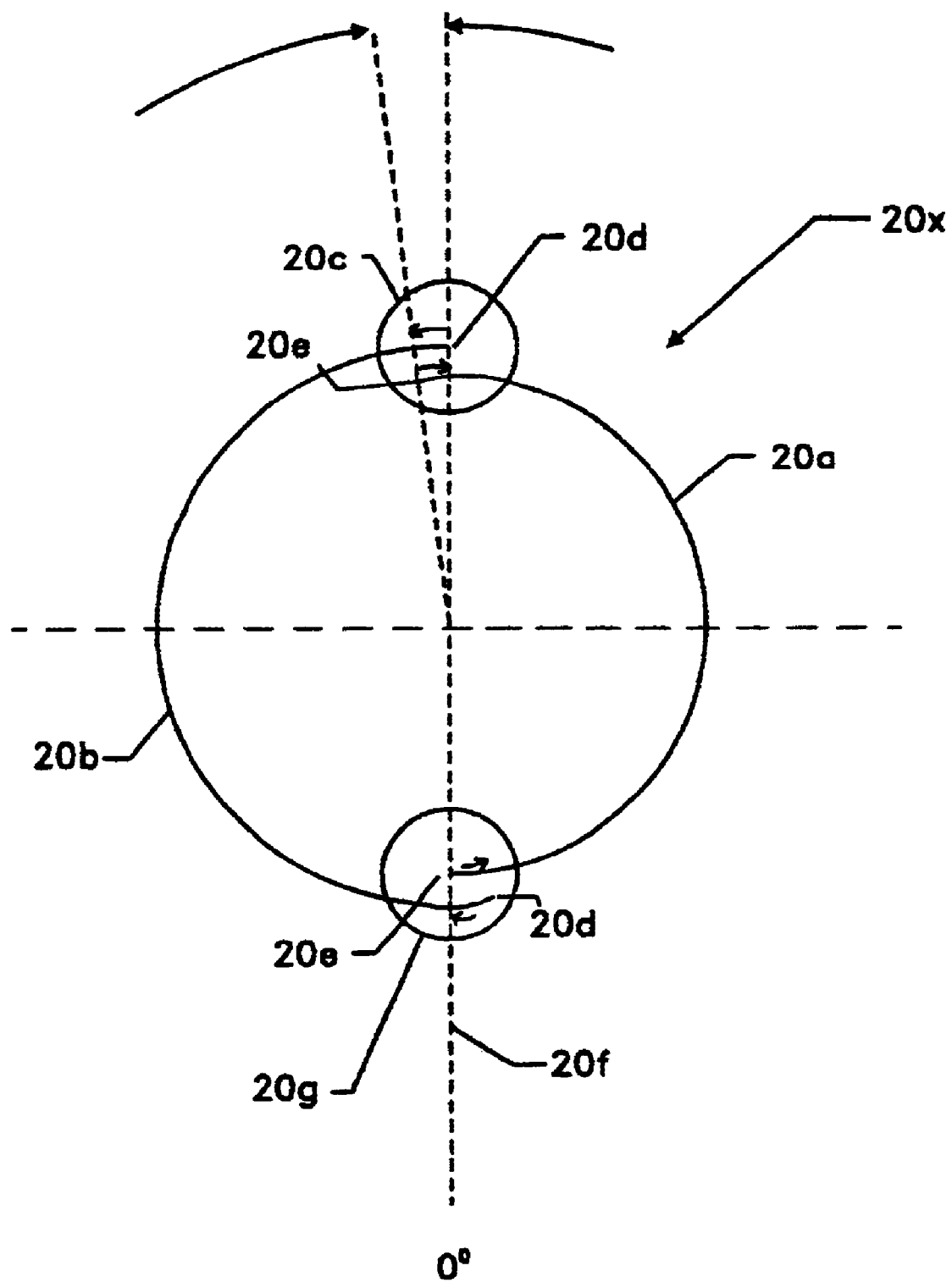
FIG. 11 is a cross-sectional view of an inner skin layer showing underlapping and overlapping skin halves according to one embodiment of the disclosed method and apparatus.

FIG. 11 is a cross-sectional representation of an inner skin ply 20x, showing underlapping inner skin ply half 20a and overlapping inner skin ply half 20b. Areas of overlap (or circumferential expansion joints) are shown within circles and are typically placed at opposite sides of the composite inner skin shell ply 20f. These overlapping areas provide a full cylinder or continuous skin of fibers. These layers also allow for shell expansion without inducing substantial load or stretching into the fibers during curing, and while at the same time providing full structural strength after cure. For example, during cure the prepreg material of inner skin shell 20 is expanded outward toward the inner surface of clam shell molds. This occurs before the epoxy resin of the prepreg skin material has hardened or cured. During expansion, individual fibers of overlapping and underlapping sections of skin ply halves 20a and 20b are allowed to move or slide against or in relation to each other in the direction indicated in the circled areas 20c of FIG. 11, thus allowing expansion of inner skin shell 20, for example, against an inner surface of a clam shell mold. Similar overlapping skin ply halves are typically employed in the placement of an outer skin ply 22 for outer skin 22, and for any additional fiber ply skin layers present.

Advantageously, by providing discontinuous fiber segments juxtaposed in relation to each other so as to allow circumferential expansion, an uncured fiber placed body having a full cylinder continuous hoop skin may be expandable against the interior of a clam shell mold before and/or during curing. This expansion process tends to flatten out and straighten individual fibers, as well as to create a substantially uniform surface from forced contact with the mold interior surfaces. In addition, circumferential expansion of the fiber placed body away from a mandrel body serves to create clearance between the fiberplaced body and associated bladder, thereby facilitating removal of the body and bladder from the mandrel. This expansion occurs without substantial stretching or creation of residual stresses.

While FIG. 11 illustrates a inner skin ply having two overlapping expansion joints 20c and 20g at the top and bottom of skin ply 20x, it will be understood with benefit of the present disclosure that expansion joints 20c and 20g may be positioned at other locations and utilized with other composite sandwich layers, symmetrically or unsymmetrically, around the circumference of skin ply 20x. It will also be understood that a varying number of circumferential expansion joints may be used including, for example, only one overlapping expansion joint, or three or more overlapping joints in a skin ply 20x.

In further detail for this embodiment, FIG. 11 is a cross-sectional view looking down longitudinal axis of one embodiment of a longitudinal composite part, such as a fuselage component. As shown in FIG. 11, underlapping fibers 20a are applied in the circumferential direction starting at 0° and wrapped 180° plus an overlap distance, and then cut. Overlapping fibers 20b for the second half of the ply are then started at 180° and wrapped to 360° plus an overlap distance, and then cut. Subsequent overlap areas 20c and 20g in subsequent fiber plies are rotated away from the 0° starting point far enough so the overlap areas do not stack up on one another (typically by about 5°, but may be any other angle suitable to prevent expansion area stacking) and form thickened areas in the shell.

In the practice of the disclosed method, an area of overlap having any dimension suitable for providing a circumferential expansion joint capable of allowing expansion (as described above) may be employed. However, an overlap of from about 1.0 inches to about 1.75 inches, most typically of about 1.5 inches, is typically employed for overlapping areas 20c and 20g. That is, edges 20d of overlapping skin ply half 20b typically overlaps edge 20e of underlapping skin half 20a by from about 1.25 inches to about 1.75 inches, most typically by about 1.5 inches. Most typically, edges 20d and 20e form an area of overlap that is symmetrical about composite shell center axis 20f, as shown in FIG. 11. This overlap is typically accomplished by rotating the mandrel in one direction and placing or laying out and then cutting a fiber band to form underlapping skin half 20a between overlapping areas 20c and 20g as shown. The mandrel is then rotated in the opposite direction by the amount of overlap desired (typically about 1.5 inches). Then a new fiber band is initiated at overlapping area 20g and laid out to form overlapping skin half 20b by rotating the mandrel in the first direction until the circle is completed and the band overlaps underlapping skin half 20a at overlapping area 20c.

When the shell is expanded the overlapped areas slide relative to one another reducing the length of overlap accordingly. When a prepreg is cured each ply overlap area transfers load from one side to the other making it act like a continuous path. Typically, the cured overlap is approximately one inch, although cured overlapping areas may be greater or less than this. Although FIG. 11 illustrates a circumferential ply having two overlapping areas, as many overlap areas may be used in a circumferential ply as desired. When greater than two overlapping areas are employed, each additional overlapping area reduces the amount of sliding within the other overlapping areas during expansion.

In addition to the dimensions and overlapping configuration described above, it will be understood with benefit of this disclosure that the overlap of overlapping areas 20c and 20g may vary. In addition, the amount of overlap may vary from expansion joint to expansion joint, rather than being the same for each expansion joint. Thus, it may be possible to have multiple expansion joints in which one overlapping edge 20d overlaps underlapping edge 20e by greater or less than the amount of overlap in another expansion joint. In addition, it may also be possible to form mixed overlapping shell segments in which one edge of a ply segment overlaps an adjacent ply segment and in which the other edge of the same ply segment underlaps another adjacent ply segment. It will also be understood that overlapping circumferential expansion joints 20c may be employed in a single layer or skin, or may be simultaneously employed in individual layers or skins of a multiple layer or a multiple skin sandwich composite section.

The expansion mechanism may be enhanced by heating tow filaments to reduce resin system viscosity and interfiber friction. This may be done, for example, by heating the outer surface of a heated mandrel (such as with a mandrel heating system) during the expansion process. Likewise, the interior of a clam shell mold may be heated during the expansion process (such as with a mold heating system). In some cases, both mold and mandrel may be heated. For an uncured fiber placed part, sufficient heat should be applied to heat the tow filament resin to a temperature of between about 100° F. and about 150° F., allowing a vacuum of between about 10 psi and about 15 psi to expand the part against the inner surface of a mold shell.

In areas of a composite structure requiring reinforcement, such as a wing attachment point of an aircraft fuselage, local reinforcements may be created during fiber placement of inner and outer skins, and/or may be hand placed between the fiber placement of the skins. Typically, for reinforcement areas of greater than or equal to about 4 inches in length, an integral local reinforcement is created in inner and/or outer skins using the fiber placement machine. This is typically done by placing additional fibers in the reinforcement areas to create an area of the skin that is thicker than the remainder of the skin, typically from about 10% to about 200% thicker, and which tapers down in thickness in an outward direction. Examples of such larger reinforcement areas include areas for wing attachment, areas where forward and aft sections of a fuselage join, and at places where various objects are mounted For those reinforcement areas of less than about 4 inches in length, local reinforcements are typically hand placed using fabric pieces before and/or after placement of plugs, frames and core.

Figure 26:
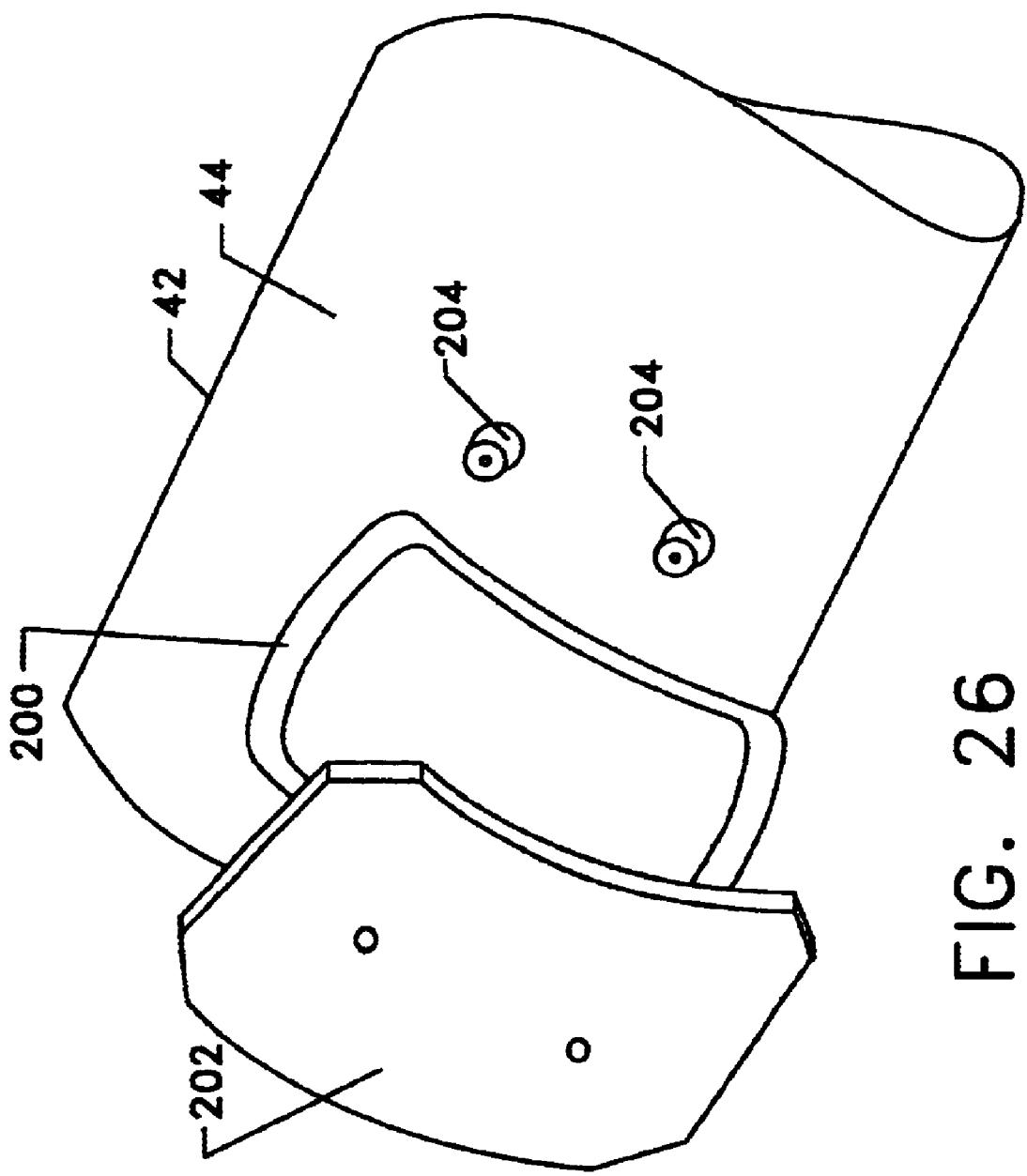
FIG. 26 is a perspective view of an integral bladder/caul sheet and corresponding locating plugs and frames according to one embodiment of the disclosed method and apparatus.
Figure 27:
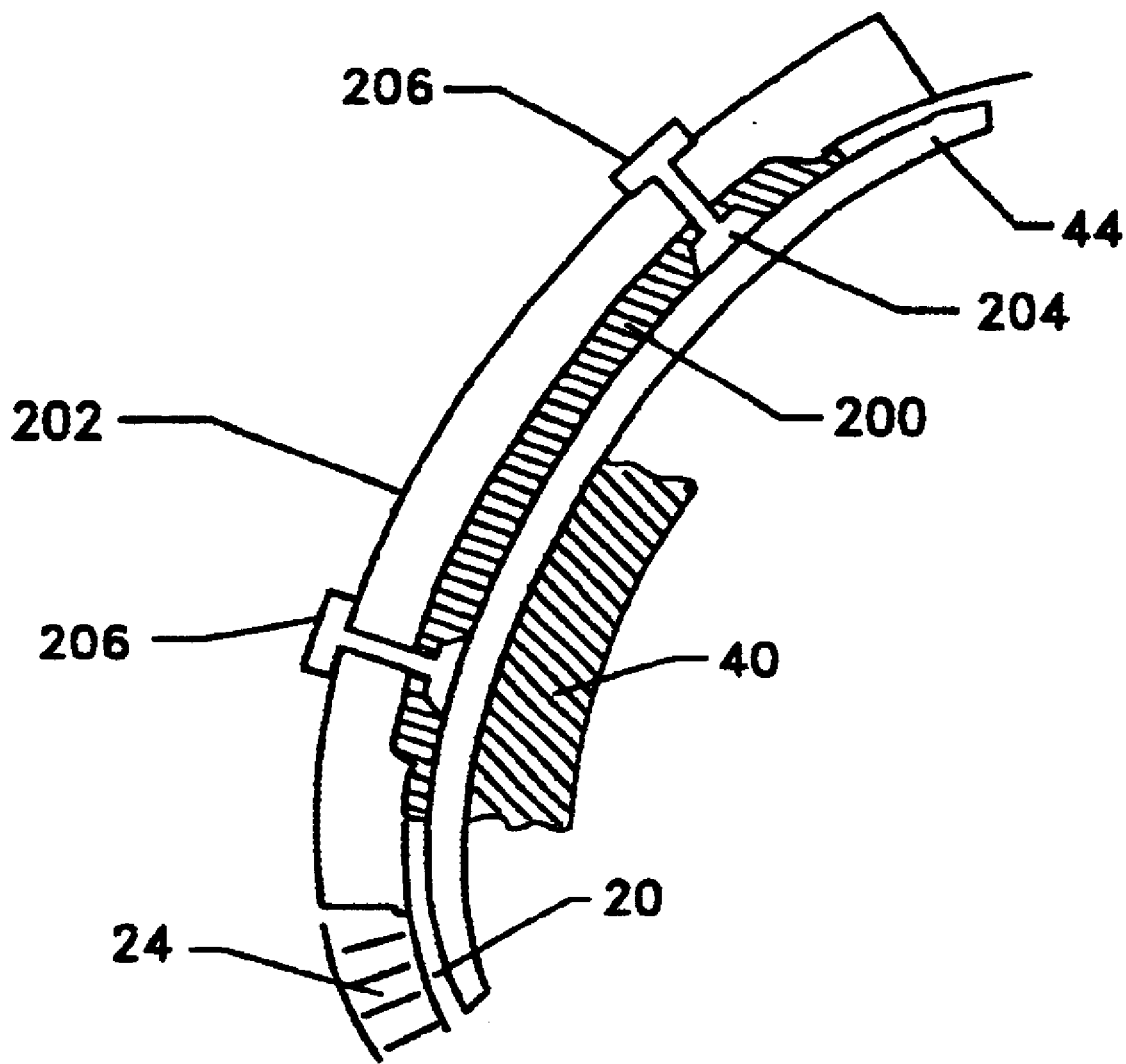
FIG. 27 is a cross-sectional view of an integral bladder/caul sheet, composite shell, locating plugs, and frames according to one embodiment of the disclosed method and apparatus.

Following fiber placement of inner skin 20 other composite shell layers may be applied including, for example, core materials and other prepreg carbon fiber materials. Typically, a honeycomb core 24 made from "NOMEX" or other suitable material is hand placed on inner skin 20, as shown in FIG. 2. Prior to hand placing honeycomb core 24, locating plugs 200 and frames 202 (typically C-staged frames) corresponding to openings in the composite shell 10 are typically hand placed as shown in FIGS. 26 and 27. The plugs 200 and frames 202 are typically placed before core 24 to take advantage of the flexibility of the core 24 in fitting it to the frames. However plugs 200 and/or frames 202 may also be placed simultaneously or after placement of core 24. Such openings include doors, windows, avionics access hatches, landing gear door hatches, etc. Typically, frames 202 are hand placed and secured by screws or bolts (or other suitable securing devices) 206, onto features or positioning pads 204 present on the bladder/caul sheet 42 underlying inner skin 20 as previously described, and as shown in FIGS. 26 and 27.

As previously mentioned, conical positioning pads 204 are left exposed through openings for plugs 200 and frames 202 left in inner skin 20, typically by programmed NC instructions to a fiber-placement machine. During fiber placement, inner skin 20 is placed so that openings in the skin exist at the conical pads 204 bonded to caul sheet section 44. This is accomplished by cutting each tow at one edge of each pad 204, skipping over the pad, and reinitiating it at the other edge of the pad. As previously described, these conical pads are configured to be received in corresponding openings defined in locating plugs 200, which are in turn secured to caul sheet section 44 with securing devices 206. Locating plugs are typically of a thickness approximately equal to the wall thickness of the completed three layer sandwich composite shell, and may be constructed of the same material as the shell, most typically of carbon epoxy sandwich structure.

Once plugs 200 and frames 202 have been attached to pads 204 of a caul sheet surface 44, honeycomb "NOMEX" core 24 may be hand placed over inner skin 20 in such a way that the preplaced frames 202 create openings in the core as shown in FIG. 27.

Once honeycomb core 24 is in place on inner skin 20, outer skin 22 may be formed over core 24 using a fiber-placement machine or other methods. Outer skin 22 is typically formed using fiber placement machine in a manner similar to inner skin 20, including the use of circumferential expansion joints and leaving openings corresponding to frames 202 and/or other features. Following fiber-placement of outer carbon fiber skin 22, other layers may be placed. For example, a fabric layer containing metal filaments for lightning protection is typically applied. Plugs 200 are typically removed following curing of a composite part.

Figure 12:
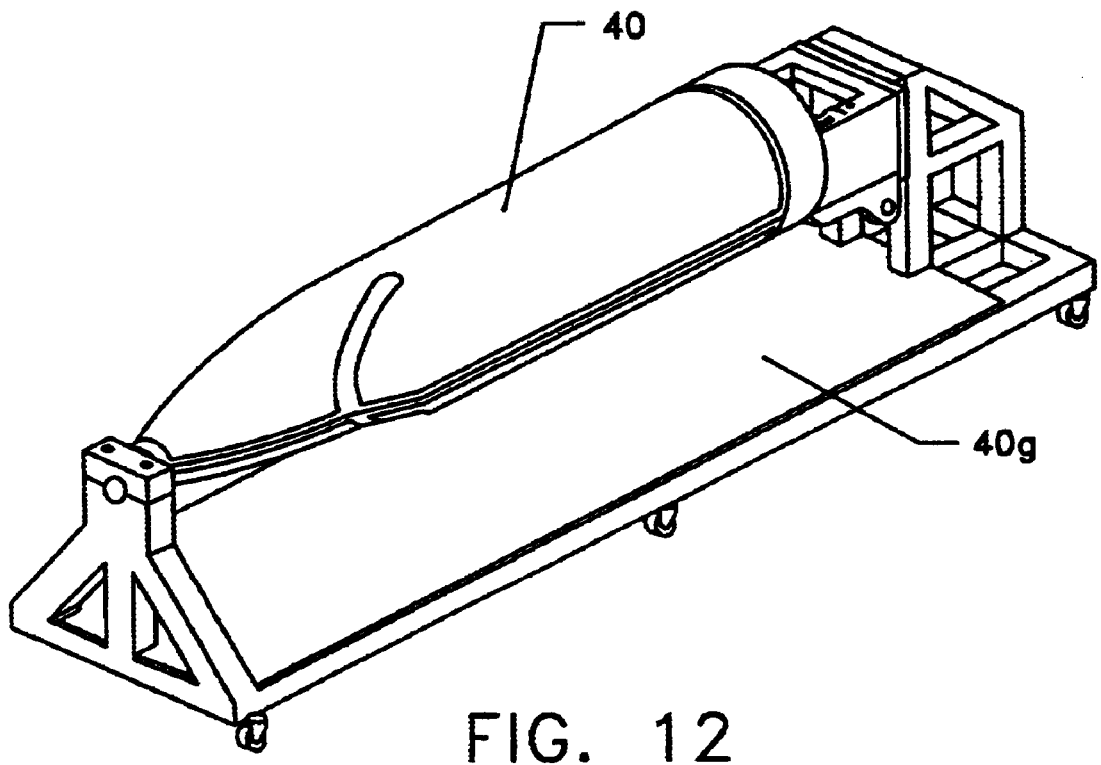
FIG. 12 is a perspective view of a mandrel with integral bladder/caul sheet installed on a mandrel transportation dolly according to one embodiment of the disclosed method and apparatus.

Typically, hand placement steps mentioned above are accomplished with the mandrel 40 positioned in the machine or in a mandrel transportation dolly 40g as shown in FIG. 12, although any other suitable method may be employed.

Molding and Curing

Figure 13:
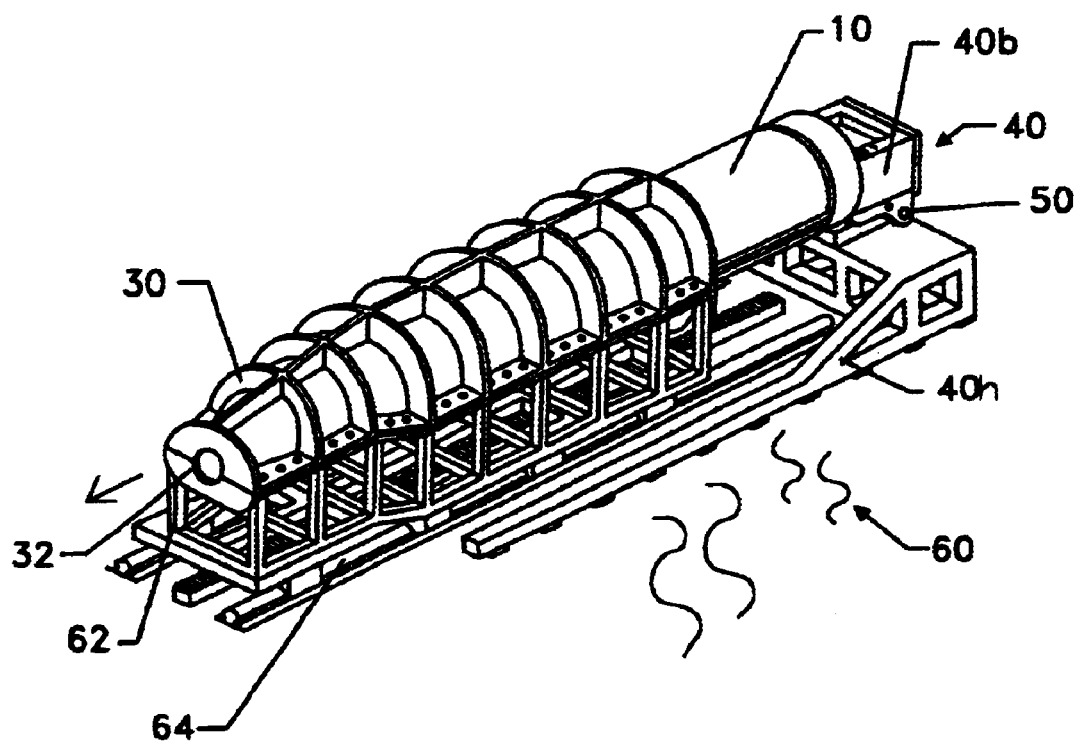
FIG. 13 is a perspective view of a mandrel, mandrel removal fixture, and clam shell molds according to one embodiment of the disclosed method and apparatus.
Figure 14:
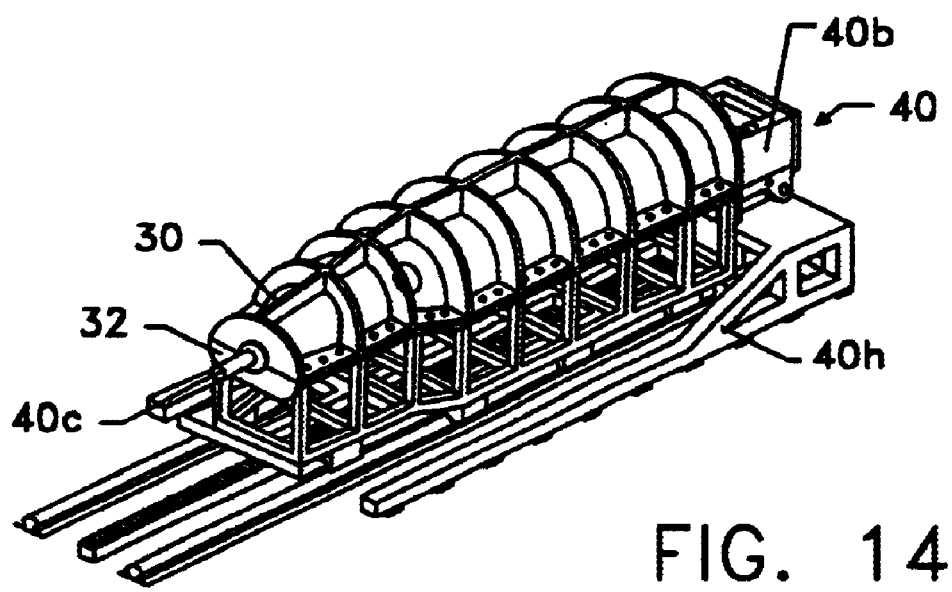
FIG. 14 is another perspective view of a mandrel, mandrel removal fixture, and clam shell molds according to one embodiment of the disclosed method and apparatus.

In a typical embodiment of the disclosed method, once fiber-placement (by any suitable method) and hand layup of the composite shell layers is completed. Mandrel 40 and uncured fiber placed composite shell 10 is then positioned or installed within clam shells 30 and 32 as shown in FIG. 14. This is typically accomplished by transferring the mandrel 40 and shell 10 to a mandrel extraction device, such as a mandrel extraction fixture 40h (as shown in FIG. 13). The lower clam shell half 32 is then rolled under mandrel 40 and the upper clam shell half 30 placed on top of (or mated to) lower clam shell half 32. In the most typical embodiment, a vacuum bag (which may be disposable or a reusable permanent bag 100 as previously described) is installed, sealing bladder/caul sheet 42 to the clam shells 30 and 32, and the sides of the clam shells 30 and 32 as previously described. The vacuum holding bladder/caul sheet 42 to mandrel 40 is then released. Next, a vacuum is drawn between bladder/caul sheets 42 and clam shell molds 30 and 32, typically using a vacuum pump connected to openings or ports in the clam shell molds. Vacuum pump and vacuum port plumbing may be accomplished using methods and devices known to those skilled in the art. Typically a vacuum of about 15 psi is applied. This vacuum, in conjunction with atmospheric pressure outside the sealed bladder to mold annulus, serves to draw integral bladder/caul sheet 42 out against the inner skin of uncured composite fiber placed shell 10, thereby expanding it out against the interior surfaces 30a and 32a of clam shell molds 30 and 32. At the same time, the vacuum serves to expand the composite shell 10 and bladder/caul sheet 42 away from the mandrel surface. As described previously, heating may be used if desired to assist the expansion.

Expansion serves to create a clearance of between about 0.4 inches and about 0.10 inches, most typically about 0.060 inches, between the outer surface of mandrel 40 and the inside surface of the bladder 43. This clearance is typically somewhat larger than the initial clearance between the interior surfaces 30a and 32a of the clam shell molds and the exterior surface of the fiber placed shell 10, because uncured fiber placed composite shell 10 is not completely compacted until the autoclave curing process is complete. For the same reason, it is also typically larger than the initial clearance between the outer surface of mandrel 40 and the inner surface of bladder 43. It will be understood with benefit of this disclosure that the clearance may not be uniform and may therefore not be present around the entire outer surface of mandrel 40.

Next, mandrel 40 is removed from clam shell molds 30 and 32, leaving uncured shell 10 and integral caul sheet/ bladder 42 within the clam shell molds. It has been found that even with a vacuum established between the clam shell molds and integral bladder/caul sheet 42, mandrel 40 is typically not freely detachable from the interior of the bladder/caul sheet 42. Typically, there is at least some adhesion or friction between mandrel 40 and bladder/caul sheet 42 during mandrel removal. Forces resisting mandrel removal typically are proportional to the surface area of the mandrel and any irregularities in thickness or shape of the tooling components that may exist. Therefore, in order to facilitate removal of the mandrel, fluid pressure may be applied to the mandrel body fluid system. This produces fluid flow through openings 40e in the surface of mandrel 40, thereby tending to provide a fluid bearing that tends to lift or separate the inner surface of bladder 43 from the outer surface of mandrel shell 40a, allowing uncured composite fiberplaced shell 10 and integral caul sheet/bladder 42 to be floated off mandrel 40. Typically, from about 10 psi to about 40 psi of air is applied to accomplish mandrel removal. During this process, air typically leaks out at the ends of the bladder/caul sheet 42.

Removal of mandrel 40 from caul sheet/bladder 42 is typically facilitated using mandrel removal fixture 40h illustrated in FIG. 13. Mandrel removal fixture (or platform) 40h is designed to be capable of supporting mandrel 40 and fiber placed composite shell 10 (typically on their side) on one end in cantilever fashion within clam shells 30 and 32 using aft mandrel support structure 40b. Mandrel removal fixture 40h is designed so that the longitudinal axis of the mandrel 40 and accompanying fiber placed composite shell 10 may be adjusted at pivot point 50 so that they are parallel with the floor 60 for removal. As shown in FIG. 13, in one embodiment clam shell mold half 32 fits on a cart 62 that is mounted on rail 64 that is aligned with the axis of the mandrel 40, composite shell 10 and clam shell molds 30 and 32. Typically, alignment of mandrel 40 and clam shells 30 and 32 on extraction cart 62 are adjusted if necessary to ensure that the assembly of bladder/caul sheet 42, composite shell 10, and clam shells 30 and 32 may be rolled away without binding. When the components are properly aligned, fluid pressure (typically compressed air) is applied to the mandrel body fluid supply system to provide floatation between the mandrel 40 and bladder/caul sheet 42. At this point, the assembly including the bladder/caul sheet 42, composite shell 10, clam shells 30 and 32, and cart 62 are rolled away leaving mandrel 40 on extraction fixture 40h. Next, uncured fiber placed composite shell 10 and clam shell molds 30 and 32 are transferred (typically using an autoclave cure cart) into an autoclave for curing, as described below. Advantageously, a second integral bladder/caul sheet 42 may be applied to mandrel 40 and mandrel 40 may be returned to the fiber placement machine for placement of the next composite shell.

Next, fiber placed composite shell 10 and clam shell molds 30 and 32 are transferred, typically with the same about 15 psi vacuum drawn between integral bladder/caul sheet 42 and clam shells 30 and 32 as described above, into a controlled environment for curing and consolidation of laminates. Typically a controlled curing environment is provided by an autoclave filled with a gas, such as nitrogen or carbon dioxide, that won't support combustion. Once placed in the autoclave, the clam shell vacuum system is typically attached to the autoclave vacuum system and the autoclave door sealed shut. Curing of the composite fuselage shell 10 is then accomplished by increasing nitrogen pressure in the autoclave to a prescribed level (typically from about 40 psi to about 100 psi, most typically about 45 psi with a honeycomb sandwich structure), and by increasing the autoclave temperature to between about 340° F. and about 360° F., most typically about 350° F. in a prescribed manner (i.e., heating rate and schedule) to complete chemical reaction of the particular resin system (typically epoxy for this embodiment). The bladder/caul sheet to clam shell vacuum may be released after autoclave pressure reaches about 15 psi or above. To obtain good part expansion and a good conformal outer surface on a fiber placed part, a total differential of between about 40 psi and about 50 psi, most typically about 45 psi, is typically employed between the clam shell mold vacuum (within the bladder/clam shell space) and the autoclave pressure (outside the bladder).

During the curing process, among other things, resin is hardened and any trapped air is eliminated from between fiber plies or laminates. Typically, temperature within the autoclave is increased to between about 340° F. and about 360° F., most typically about 350° F. for curing. However, it will be understood the specific combination of time within the autoclave, temperature, and pressure may be specified or varied as necessary to develop the desired quality laminate within a chosen resin system.

In this aircraft fuselage embodiment, an autoclave molding process, with its flexible membrane, is typically desirable to other molding techniques (such as compression molding). This is because the parts are large and/or may have complex contours. In addition, the use of a flexible membrane allows the pressure in the autoclave to act uniformly on the surface of a composite part, and allows the most uniform temperature distribution throughout the part during cure. However, although an autoclave process with flexible membrane has been described above for molding and curing of a fiber placed composite shell, it will be understood with benefit of the present disclosure that other molding and curing processes may be successfully employed to mold and/or cure composite shells or other composite parts produced using the disclosed method. It will also be understood that the clam shell molds, integral bladder/caul sheet, mandrel, associated fluid systems, and other aspects of the disclosed method and apparatus may be employed individually or together to mold and cure composite parts formed using other fabrication techniques.

Bladder/Caul Sheet Removal and Re-Installation

Once composite fuselage shell 10 has been cured within the autoclave, it is removed along with clam shell molds 30 and 32 from the autoclave. The vacuum is then released from the clam shell vacuum system, and the bladder/caul sheet 42 carefully removed from inside of the fuselage shell 10. In one embodiment, a bladder/caul sheet removal fixture is typically used to remove bladder/caul sheet 42 from fuselage shell 10. The bladder/caul sheet removal fixture includes vacuum or suction cups mounted on double acting air cylinders and extending radially in position such that they may be deployed within the interior of an integral bladder/caul sheet 42. Once positioned within the bladder/caul sheet 42, the double acting air cylinders are energized so that vacuum cups are placed against the inner surface of bladder 42. Next, the bladder/caul sheet removal fixture is removed along the longitudinal axis of fuselage shell 10 such that bladder/caul sheet 42 is removed by the vacuum cups from fuselage shell 10 and then slid out. A bladder/caul sheet installation fixture is typically fitted over the outside surface of an integral bladder/caul sheet 42 and expanded so that it may be slid back onto a mandrel for reuse.

It will be understood with benefit of the present disclosure that the disclosed method and apparatus may be employed without the use of bladder/caul sheet removal and/or installation fixtures, and that a bladder/caul sheet may be installed on a mandrel or removed from a composite shell using any suitable method, including methods that are destructive to the bladder/caul sheet 42 (in which case it may not be reused). It will also be understood that the methods and apparatus described above may be employed with a bladder having no integral caul sheet.

Following removal of bladder/caul sheet 42 from composite shell 10, clam shell mold halves 30 and 32 are separated and composite shell 10 removed for further finishing. Such further finishing may include, for example, attachment to other composite shell components, such as for example another composite section using methods known to those of skill in the art.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed structures and methods may be utilized in various combinations and/or independently. Thus, the invention is not limited to only those combinations shown herein, but rather may include other combinations.

What is claimed is:

1. A method useful in forming a composite body, comprising the steps of:
   providing a mandrel body having an outer surface;
   positioning a bladder having outer and inner surfaces around said mandrel body;
      said bladder having at least one caul sheet section coupled to said outer surface of said bladder; and
   placing a plurality of fibers around said bladder and caul sheet to form an uncured body.

2. The method of claim 1, one or more fluid openings being defined in said mandrel body outer surface, further comprising the steps of:
   supplying a vacuum to said one or more fluid openings during the step of placing fibers around said bladder and caul sheet, such that said inner surface of said bladder is held tightly and securely against said outer surface of said mandrel body;
   releasing said vacuum to said one or more fluid openings after the step of placing fibers around said bladder and caul sheet;
   supplying pressurized fluid to said one or more fluid openings; and
   removing said bladder, caul sheet section and uncured body from around said outer surface of said mandrel body while said pressurized fluid is being supplied to said fluid openings.

3. The method of claim 2 wherein said fluid is a gas.

4. The method of claim 2 wherein said bladder has forward and aft ends, and further comprising the steps of:
   providing a clam shell mold, said clam shell mold having an inner surface, forward and aft ends, and a shape and dimension complementary to said uncured body such that said clam shell mold may be fitted around said uncured body, caul sheet section, and bladder;
   placing said clam shell mold around said uncured body after the step of placing said plurality of fibers around said bladder and caul sheet;
   sealing said forward end of said bladder to said forward end of said clam shell mold and sealing said aft end of said bladder to said aft end of said clam shell mold prior to the steps of releasing said vacuum to said one or more fluid openings, such that a sealed annular space is created between said bladder outer surface and said clam shell mold inner surface;
   inducing a vacuum in said sealed annular space prior to the step of removing, such that said outer surface of said bladder and said outer surface of said caul sheet section compress said uncured body against said inner surface of said clam shell mold while said bladder, caul sheet section and uncured body are removed from around said outer surface of said mandrel body;
   curing said uncured body at an elevated temperature and an elevated pressure after said step of removing to form said composite body;
   releasing said vacuum within said annular space;
   removing said clam shell mold from around said composite body; and
   removing said bladder and caul sheet section from said composite body.

5. The method of claim 4 wherein said bladder is sealed to said clam shell mold using a reusable bag.

6. The method of claim 2, wherein said step of placing comprises the steps of:
   placing a first layer of fibers around said bladder and caul sheet to form a first fiber skin of said fiber body; and
   placing at least one additional layer of fibers around said bladder and caul sheet to form at least one additional fiber skin of said fiber body, said first fiber skin and said additional fiber skin forming a pair of fiber skins.

7. The method of claim 6, further comprising the step of placing at least one other layer of material between said pair of fiber skins.

8. The method of claim 7, wherein said other layer of material comprises a honeycomb core.

9. The method of claim 1, wherein said step of placing comprises the step of:
   placing a plurality of fibers around said bladder and caul sheet to form an uncured body, wherein said fibers are placed around said bladder and caul sheet in a plurality of discontinuous segments juxtaposed in relation to each other, and wherein said discontinuous segments are capable of moving in relation to each other such that said uncured body is expandable from within.

10. The method of claim 9, wherein said mandrel body has an elongated shape and a longitudinal axis, and wherein said discontinuous segments include at least one overlapping segment having a first edge and at least one underlapping segment having a first edge, and wherein said step of placing comprises the step of:

placing said plurality of fibers such that said first edge of said overlapping segment overlaps said first edge of said underlapping segment to form an overlapping area, said overlapping area being oriented substantially parallel to said longitudinal axis of said mandrel body.

11. The method of claim 1, wherein said fiber is placed with an automated fiber placement machine.

12. The method of claim 1, wherein said at least one caul sheet section overlays said outer surface of said bladder to form a caul overlay area, and wherein at least one caul expansion space is defined in said caul overlay area.

13. The method of claim 1, wherein said mandrel body has an elongated shape and a longitudinal axis, and wherein said step of placing comprises the step of:

placing a plurality of fibers around said bladder and caul sheet to form an uncured body comprising at least one continuous skin of fibers disposed around said longitudinal axis of said mandrel body.

14. A method useful in forming a composite body, comprising the steps providing a tool useful in forming a composite body, said tool comprising:
a mandrel body having an outer surface, said mandrel body having an elongated shape and a longitudinal axis and having one or more fluid openings defined in said mandrel body outer surface;
a bladder having outer and inner surfaces, said bladder having a shape and dimensions complementary to said outer surface of said mandrel body;
at least one caul sheet section having outer and inner surfaces, said inner surface being coupled to said outer surface of said bladder
a mandrel body fluid system capable of supplying pressurized fluid and a vacuum to said one or more openings in said mandrel body outer surface; and
positioning said bladder around said mandrel body prior to placing a plurality of fibers around at least one caul sheet section to form an uncured body, said fibers being placed around said at least one caul sheet section in a plurality of discontinuous segments juxtaposed in relation to each other such that said discontinuous segments are capable of moving in relation to each other such that said uncured body is expandable from within.

15. A method useful in forming a composite body, comprising the steps of:

providing a tool for use in forming a composite body, said tool comprising:
a mandrel body having an outer surface;
one or more fluid openings defined in said mandrel body outer surface;
a bladder having outer and inner surfaces, said bladder having a shape and dimensions complementary to said outer surface of said mandrel body and said inner surface of said bladder being fitted around said outer surface of said mandrel body;
at least one caul sheet section having an inner surface being coupled to said outer surface of said bladder such that said caul sheet section overlays at least a portion of said outer surface of said bladder; and
a mandrel body fluid system capable of supplying pressurized fluid and a vacuum to said one or more openings in said mandrel body outer surface;
wherein said mandrel body fluid system is capable of supplying pressurized fluid or a vacuum to said one ore more openings in said mandrel body outer surface such that laid fluid flows through said one or more openings in a single direction, said single direction being either outward from said one or more openings, or inward into said once or more openings; and placing a plurality of fibers around said tool to form an uncured body.

16. A method useful in forming a composite body, comprising the steps of:

providing a mandrel body having an outer surface, said mandrel body having an elongated shape and a longitudinal axis;

positioning a bladder having outer and inner surfaces around said mandrel body, said bladder having at least one caul sheet section coupled to said outer surface of said bladder; and placing a plurality of fibers around said bladder and caul sheet to form an uncured body, said fibers being placed around said bladder and caul sheet in a plurality of discontinuous segments juxtaposed in relation to each other such that said discontinuous segments are capable of moving in relation to each other such that said uncured body is expandable from within.

17. A method useful in forming a composite body, comprising the steps of:

providing a tool for use in forming a composite body, said tool comprising:
a mandrel body having an outer surface;
one or more fluid openings defined in said mandrel body outer surface;
a bladder having outer and inner surfaces, said bladder having a shape and dimensions complementary to said outer surface of said mandrel body and said inner surface of said bladder being fitted around said outer surface of said mandrel body;
at least one caul sheet section having an inner surface, said inner surface being coupled to said outer surface of said bladder such that said caul sheet section overlays at least a portion of said outer surface of said bladder; and placing a plurality of fibers around said tool to form an uncured body.

* * * * *